(12) United States Patent
Chen

(10) Patent No.: US 10,742,787 B2
(45) Date of Patent: Aug. 11, 2020

(54) MOBILE TERMINAL AND METHOD FOR CONTROLLING MOBILE TERMINAL

(71) Applicant: GUANGDONG OPPO MOBILE TELECOMMUNICATIONS CORP., LTD., Dongguan, Guangdong (CN)

(72) Inventor: Jia Chen, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/281,403

(22) Filed: Feb. 21, 2019

(65) Prior Publication Data

US 2019/0342435 A1 Nov. 7, 2019

(30) Foreign Application Priority Data

May 4, 2018 (CN) .......................... 2018 1 0421797
May 4, 2018 (CN) ..................... 2018 2 0676770 U

(51) Int. Cl.
*H04M 1/00* (2006.01)
*H04M 1/02* (2006.01)

(52) U.S. Cl.
CPC ....... *H04M 1/0268* (2013.01); *H04M 1/0216* (2013.01); *H04M 1/0264* (2013.01)

(58) Field of Classification Search
CPC ............. H04M 1/0268; H04M 1/0216; H04M 1/0264; H04M 1/0214
See application file for complete search history.

(56) References Cited

U.S. PATENT DOCUMENTS

| | | | | |
|---|---|---|---|---|
| 8,432,485 B1 * | 4/2013 | Martinez | .............. | H04N 5/2254 348/207.1 |
| 2001/0005454 A1 * | 6/2001 | Nishino | .............. | H04M 1/0216 396/287 |
| 2006/0261257 A1 | 11/2006 | Hwang | | |
| 2006/0268142 A1 * | 11/2006 | Yi | ........................ | H04M 1/0264 348/333.06 |

(Continued)

FOREIGN PATENT DOCUMENTS

| | | |
|---|---|---|
| CN | 103595836 A | 2/2014 |
| CN | 107528940 A | 12/2017 |

(Continued)

OTHER PUBLICATIONS

International search report,PCT/CN2019/075603, dated Apr. 26, 2019 (4 pages).

(Continued)

*Primary Examiner* — Barry W Taylor

(57) ABSTRACT

A mobile terminal includes a support assembly, a display screen, and a movable base. The support assembly includes a first housing, a second housing, and a bendable member. The first housing defines a first recess. The second housing defines a second recess. The bendable member is connected between the first housing and the second housing and has a capacity of being unbent or bent to unfold or fold the support assembly. The movable base is movably mounted in the first recess. The movable base is able to carry the camera to move out or retract into the first recess with respect to the first circumferential side surface, and the second recess is configured to accommodate a part of the movable base.

18 Claims, 17 Drawing Sheets

(56) References Cited

U.S. PATENT DOCUMENTS

| | | | |
|---|---|---|---|
| 2009/0059043 A1 | 3/2009 | Demuynck | |
| 2018/0007242 A1* | 1/2018 | Maatta | G06F 1/1616 |
| 2018/0110144 A1 | 4/2018 | Wang et al. | |
| 2018/0255219 A1* | 9/2018 | Ramaprakash | H04N 5/2257 |

FOREIGN PATENT DOCUMENTS

| | | |
|---|---|---|
| CN | 107864242 A | 3/2018 |
| CN | 208128323 U | 11/2018 |
| CN | 208128326 U | 11/2018 |
| CN | 208128327 U | 11/2018 |
| EP | 1558007 A1 | 7/2005 |
| EP | 2720140 A1 | 4/2014 |

OTHER PUBLICATIONS

European search report, EP19158197, dated Sep. 26, 2019 (10 pages).

* cited by examiner

MOBILE TERMINAL AND METHOD FOR CONTROLLING MOBILE TERMINAL

CROSS-REFERENCE TO RELATED APPLICATIONS

This application claims priorities to Chinese Patent Application No. 201820676770.1, filed on May 4, 2018, and Chinese Patent Application No. 201810421797.0, filed on May 4, 2018, the contents of which are herein incorporated by reference in their entireties.

TECHNICAL FIELD

The present disclosure generally relates to the technical field of mobile terminal.

BACKGROUND

Nowadays, in order to obtain better using experience, demands for large-screen displaying by users are increasing rapidly. However, components such as a camera also need to be arranged on the front surface of a mobile phone, and those components limit the space for the arrangement of the display screen, so it is difficult to improve the screen-to-body ratio of the mobile phone.

SUMMARY OF THE DISCLOSURE

According to one aspect of the present disclosure, a mobile terminal is provided. The mobile terminal includes a support assembly, a display screen, and a movable base. The support assembly includes a first housing, a second housing, and a bendable member. The first housing defines a first recess, and includes a first inner surface, a first outer surface disposed opposite to the first inner surface, and a first circumferential side surface connected between the first inner surface and the first outer surface. The first inner surface is recessed toward the first outer surface such that the first recess is defined, and the first recess is extended to the first circumferential side surface. The second housing defines a second recess and includes a second inner surface opposite to the first inner surface when the support assembly is folded, and a second outer surface disposed opposite to the second inner surface. The first recess is covered by a projection of the second recess on the first inner surface. The bendable member is connected between the first housing and the second housing and has a capacity of being unbent or bent to unfold or fold the support assembly. A part of the display screen is carried on the first outer surface, and another part of the display screen is carried on the second outer surface. The movable base is movably mounted in the first recess. A camera is disposed in the movable base, the movable base is able to carry the camera to move out or retract into the first recess with respect to the first circumferential side surface, and the second recess is configured to accommodate a part of the movable base.

According to another aspect of the present disclosure, a mobile terminal is provided. The mobile terminal includes a first housing defining a first recess, a second housing defining a second recess, a bendable member, and a movable base with a camera. The bendable member is connected between the first housing and the second housing to enable the first housing is unfolded or folded with respect to the second housing. The movable base with a camera is movably mounted on the first housing. The movable base with the camera is configured to be accommodated in the first recess when the first housing is unfolded with respect to the second housing, and configured to be accommodated a chamber defining by the first recess and the second recess when the first housing is folded with respect to the second housing.

According to another aspect of the present disclosure, a mobile terminal is provided. The mobile terminal includes a first housing defining a first recess, a second housing defining a second recess, a bendable member, a display screen, and a movable base. The bendable member is connected between the first housing and the second housing to enable the first housing is unfolded or folded with respect to the second housing. The display screen is disposed on the first housing, the second housing, and the bendable member. The movable base with a camera is movably mounted on the first housing. The movable base with the camera is configured to be accommodated in the first recess when the first housing is unfolded with respect to the second housing, and configured to be accommodated a chamber defining by the first recess and the second recess when the first housing is folded with respect to the second housing.

BRIEF DESCRIPTION OF THE DRAWINGS

In order to make the technical solution described in the embodiments of the present disclosure more clearly, the drawings used for the description of the embodiments will be briefly described. Apparently, the drawings described below are only for illustration but not for limitation. It should be understood that, one skilled in the art may acquire other drawings based on these drawings, without making any inventive work.

DETAILED DESCRIPTION

Figure 1:
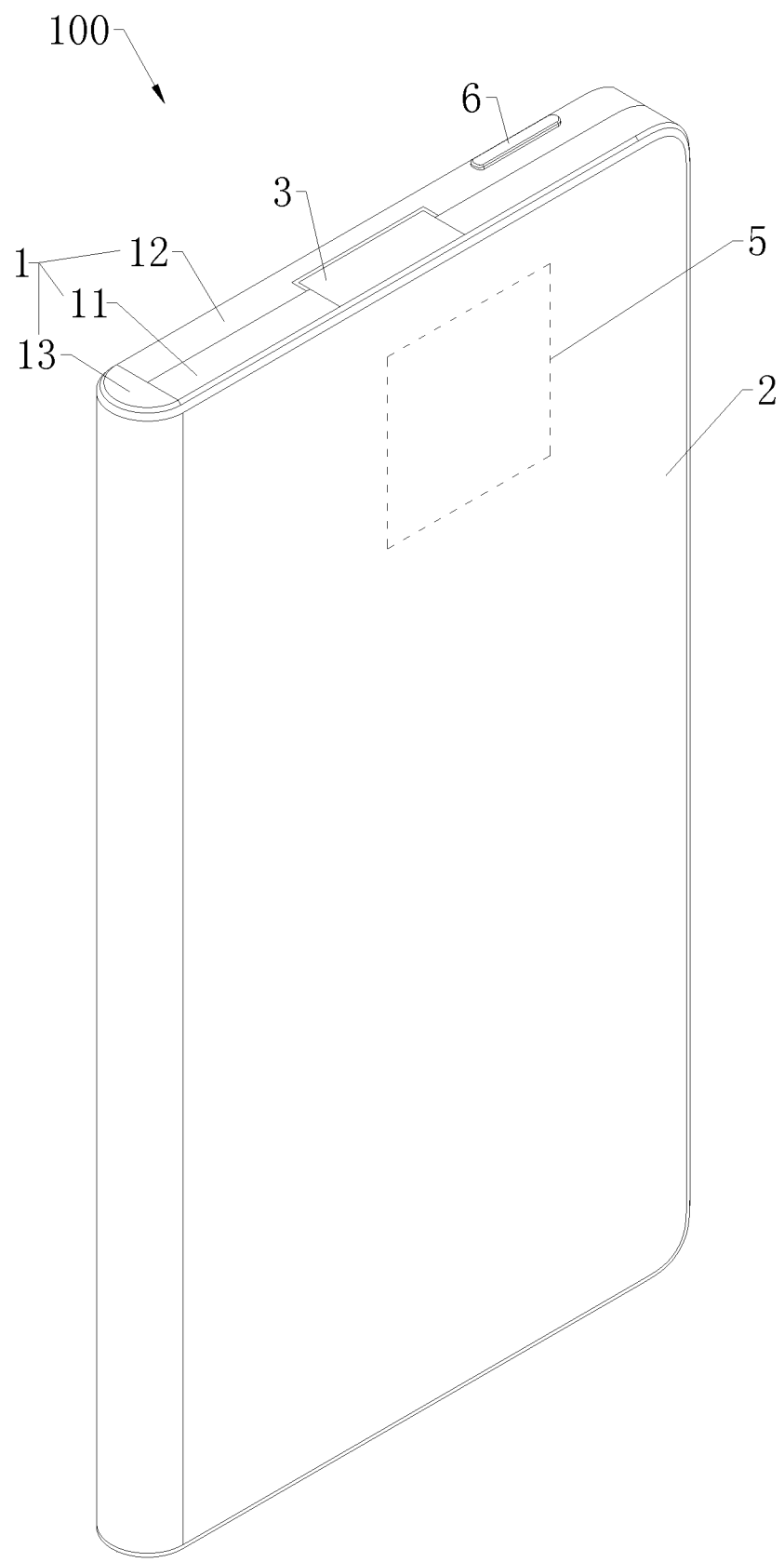
FIG. 1 is a schematic structural view of a mobile terminal in a folded state according to an embodiment of the present disclosure.

The technical solutions in the embodiments of the present disclosure are described in conjunction with the drawings in the embodiments of the present disclosure. It is obvious that the described embodiments are only a part of the embodiments of the present disclosure, and not all embodiments. All other embodiments obtained by the ordinary skilled in the art based on the embodiments in the present disclosure without the creative work are all within the scope of the present disclosure.

In addition, the description of the following embodiments is provided with reference to the accompanying drawings, which illustrates specific embodiments in which the present disclosure may be implemented. Directional terms mentioned in this present disclosure, for example, "upper", "lower", "front", "back", "left", "right", "inside", "outside", "side", etc., are only the directional terminology which is referred to the appended drawings. Therefore, those directional terms used herein are to illustrate and understand the present invention in a better and clearer manner, and not to indicate or imply that the device or component must have a particular orientation and be constructed and operated in a particular orientation. Therefore, those terms are not to be construed as limiting the present disclosure.

In the present disclosure, it is noted that, unless specified or limited otherwise, terms "mounted", "connected", "coupled", "fixed", and the like are used in a broad sense, and may include, for example, fixed connections, detachable connections, or integral connections; may also be mechanical or electrical connections; may also be direct connections or indirect connections via intervening structures; may also be inner communications of two elements, as can be understood by those skilled in the art depending on specific contexts.

In the description of the present disclosure, unless specified otherwise, "a plurality of" means two or more than two. If the term "process" appears in this specification, it means not only an independent process, but also when it is not clearly distinguishable from other processes, it is included in the term as long as the intended function of the process can be realized. In addition, the numerical range represented by "to" in this present disclosure is a range in which the numerical values described before and after "to" are respectively included as a minimum value and a maximum value. In the drawings, elements that are similar or identical in structure are denoted by the same reference numerals.

In the present disclosure, a communication terminal configured to communicate through a wireless interface may be referred to as a "wireless communication terminal," "wireless terminal," or "mobile terminal." It should be understood that, the "communication terminal" (or abbreviated as "terminal") used herein includes, but is not limited to, a device that is configured to receive/transmit communication signals via a wireline connection, such as via a public-switched telephone network (PSTN), digital subscriber line (DSL), digital cable, a direct cable connection, and/or another data connection/network, and/or via a wireless interface of one such as a cellular network, a wireless local area network (WLAN), a digital television network such as a DVB-H network, a satellite network, an AM/FM broadcast transmitter, and/or another communication terminal. Examples of the mobile terminal include, but are not limited to, a satellite or cellular radiotelephone, a Personal Communications System (PCS) terminal that may combine a cellular radiotelephone with data processing, facsimile and data communications capabilities, a PDA that can include a radiotelephone, pager, Internet/intranet access, Web browser, organizer, calendar and/or a global positioning system (GPS) receiver, and a conventional laptop and/or palmtop receiver or other appliance that includes a radiotelephone transceiver.

In one embodiment, a mobile terminal includes a support assembly, a display screen, and a movable base. The support assembly includes a first housing, a second housing, and a bendable member. The first housing defines a first recess, and includes a first inner surface, a first outer surface disposed opposite to the first inner surface, and a first circumferential side surface connected between the first inner surface and the first outer surface. The first inner surface is recessed toward the first outer surface such that the first recess is defined, and the first recess is extended to the first circumferential side surface. The second housing defines a second recess and includes a second inner surface opposite to the first inner surface when the support assembly is folded, and a second outer surface disposed opposite to the second inner surface. The first recess is covered by a projection of the second recess on the first inner surface. The bendable member is connected between the first housing and the second housing and has a capacity of being unbent or bent to unfold or fold the support assembly. A part of the display screen is carried on the first outer surface, and another part of the display screen is carried on the second outer surface. The movable base is movably mounted in the first recess. A camera is disposed in the movable base, the movable base is able to carry the camera to move out or retract into the first recess with respect to the first circumferential side surface, and the second recess is configured to accommodate a part of the movable base.

In one example, a first gap is defined between an outer sidewall of the movable base and the second inner surface in the second recess when the part of the movable base is accommodated in the second recess.

In one example, the second housing further includes a plurality of protrusions spaced apart from each other on the second inner surface in the second recess; and a second gap is defined between the plurality of protrusions and the outer surface of the movable base, and the second gap is smaller than the first gap.

In one example, the first housing includes a first sidewall and a second sidewall opposite each other, and the first sidewall and the second sidewall are in the first recess; and the movable base is slidably connected to the first sidewall and the second sidewall to be slid out or slid into the first recess.

In one example, a first guiding rail is recessed on the first sidewall, a second guiding rail is recessed on the second sidewall, and extending directions of the second guiding rail and the first guiding rail are same; a first guiding block and a second guiding block opposite to each other are disposed on the movable base; the first guiding block is slidably mounted on the first guiding rail, and the second guiding block is slidably mounted on the second guiding rail.

In one example, the first inner surface in the first recess is arced, the outer sidewall of the movable base is arced, and the outer sidewall of the movable base is opposite to the first inner surface in the first recess; and the movable base is rotatably connected to the first housing to be rotated out or into the first recess.

In one example, a projection-shape of the second recess on the first inner surface and an opening-shape of the first recess on the first inner surface are substantially same.

In one example, the first circumferential side surface includes a first top surface, a first bottom surface opposite to the first top surface, and a first side surface connected between the first top surface and the first bottom surface. The first recess is extended to one of the first top surface, the first bottom surface, and the first side surface.

In one example, the display screen is a flexible display screen; and the first outer surface, an outer surface of the bendable member, and the second outer surface collectively carry the display screen.

In one example, the support assembly further includes a first locking member disposed on the first housing and a second locking member disposed on the second housing. The first locking member is cooperated with the second locking member when the support assembly is folded.

In one example, the first locking member is a first permanent magnet, the second locking member is a second permanent magnet, and the first permanent magnet is magnetically attracted to the second permanent magnet when the support assembly is folded.

In one example, the first locking member is a block protruded from the first inner surface, the second locking member is a slot recessed in the second inner surface, and the block is engaged with the slot when the support assembly is folded.

In one example, an orientation of an image capturing surface of the camera is same as that of the first inner surface. The mobile terminal further includes a controller accommodated in the first housing or the second housing and configured to receive a shooting signal, detect that the support assembly is in an unfolded state or a folded state based on the shooting signal, and control the camera to take a shooting when the support assembly is in the unfolded state, and drive the movable base to carry the camera to move out the first recess and control the camera to take a shooting when the support assembly is in the folded state.

In one example, the display screen includes a first display area overlapped with the first outer surface and a second display area overlapped with the second outer surface. The controller is further configured to determine that the shooting signal is for front-shooting or rear-shooting, switch the first display area to display a shooting interface of the camera when the shooting signal is for rear-shooting, and switch the second display area to display the shooting interface of the camera when the shooting signal is for front-shooting.

In another example, an orientation of an image capturing surface of the camera is same as that of the first outer surface. The mobile terminal further includes a controller accommodated in the first housing or the second housing and configured to receive a shooting signal, drive the movable base to carry the camera to move out the first recess, and control the camera to take a shooting based on the shooting signal.

In one example, the display screen includes a first display area overlapped with the first outer surface and a second display area overlapped with the second outer surface. The controller is further configured to determine that the shooting signal is for front-shooting or rear-shooting, switch the first display area to display a shooting interface of the camera when the shooting signal is for front-shooting, and switch the second display area to display the shooting interface of the camera when the shooting signal is for rear-shooting.

In another embodiment, a mobile terminal includes a first housing defining a first recess, a second housing defining a second recess, a bendable member, and a movable base with a camera. The bendable member is connected between the first housing and the second housing to enable the first housing is unfolded or folded with respect to the second housing. The movable base with a camera is movably mounted on the first housing. The movable base with the camera is configured to be accommodated in the first recess when the first housing is unfolded with respect to the second housing, and configured to be accommodated a chamber defining by the first recess and the second recess when the first housing is folded with respect to the second housing.

In one example, an image capturing surface of the camera faces a wall of the first housing in the first recess. The movable base with the camera is moved out the chamber such that the camera is able to take a shooting when the first housing is folded with respect to the second housing, and the movable base with the camera is moved out the first recess such that the camera is able to take a shooting when the first housing is unfolded with respect to the second housing.

In another example, an image capturing surface of the camera faces a wall of the second housing in the second recess. The movable base with the camera is moved out the chamber such that the camera is able to take a shooting when the first housing is folded with respect to the second housing, and the movable base with the camera is moved out or retracted into the first recess such that the camera is able to take a shooting when the first housing is unfolded with respect to the second housing.

In another embodiment, a mobile terminal includes a first housing defining a first recess, a second housing defining a second recess, a bendable member, a display screen, and a movable base. The bendable member is connected between the first housing and the second housing to enable the first housing is unfolded or folded with respect to the second housing. The display screen is disposed on the first housing, the second housing, and the bendable member. The movable base with a camera is movably mounted on the first housing. The movable base with the camera is configured to be accommodated in the first recess when the first housing is unfolded with respect to the second housing, and configured to be accommodated a chamber defining by the first recess and the second recess when the first housing is folded with respect to the second housing.

In the following, a mobile terminal 100 will be described with reference to FIGS. 1-22.

Figure 2:
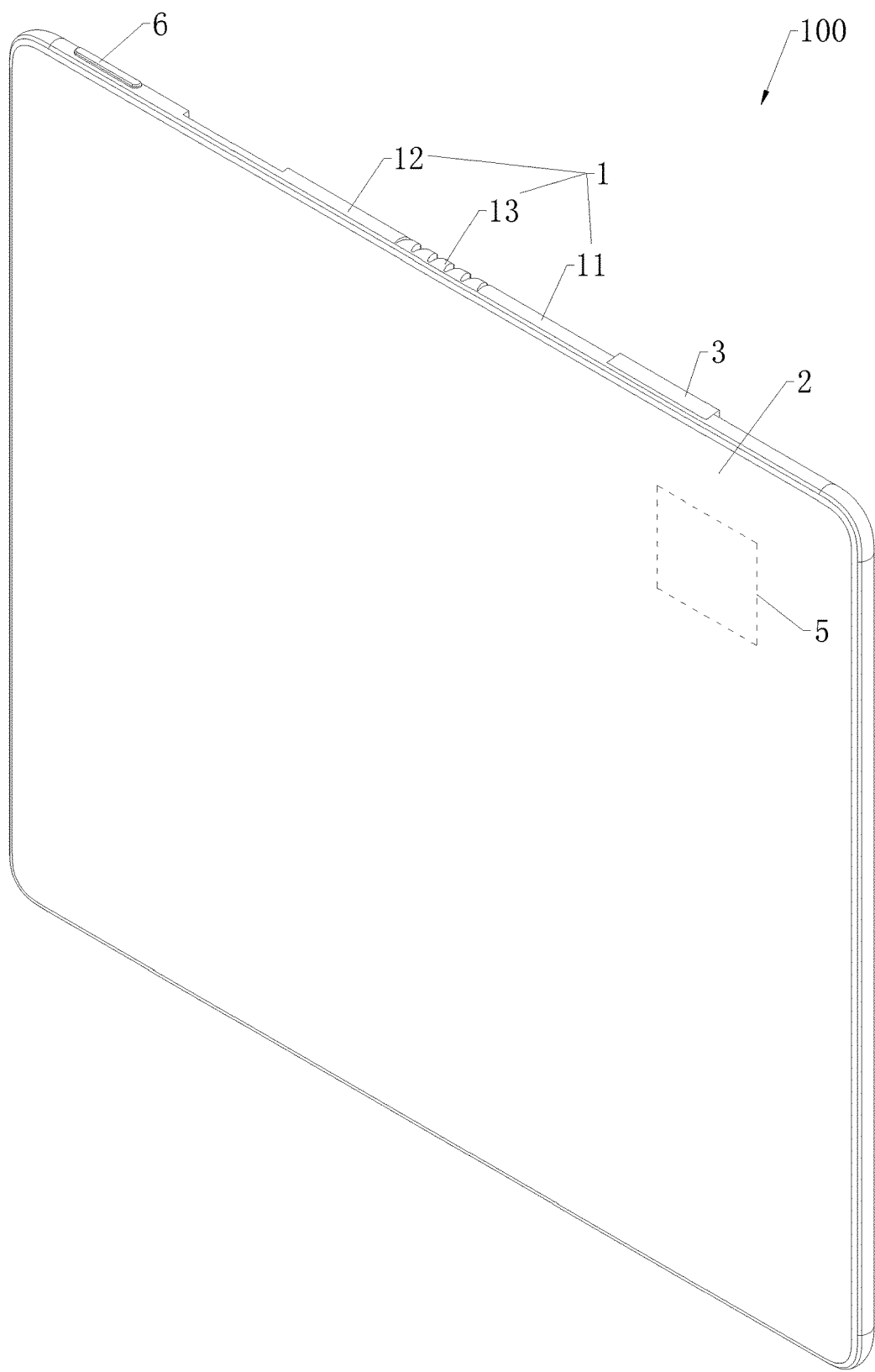
FIG. 2 is a schematic structural view of the mobile terminal of FIG. 1 in an unfolded state.

Referring to FIG. 1 and FIG. 2 together, a mobile terminal 100 is illustrated in an embodiment of the present disclosure.

The mobile terminal 100 includes a support assembly 1, a display screen 2, and a movable base 3. The display screen 2 is fixed to the support assembly 1. The support assembly 1 includes a first housing 11, a second housing 12, and a bendable member 13. The bendable member 13 is connected between the first housing 11 and the second housing 12. The bendable member 13 can be unbent or bent to unfold or fold the support assembly 1.

In the present disclosure, when the support assembly 1 is in an unfolded state, an angle from 120° to 180° is formed between the first housing 11 and the second housing 12. As shown in FIG. 2, when the support assembly 1 is unfolded, an angle of 180° between the first housing 11 and the second housing 12 is taken as an example for description in the present disclosure. When the support assembly 1 is in a folded state, an angle from 0° to 15° is formed between the first housing 11 and the second housing 12. As shown in FIG. 1, when the support assembly 1 is folded, an angle of 0° between the first housing 11 and the second housing 12 is taken as an example for description in the present disclosure.

Figure 3:
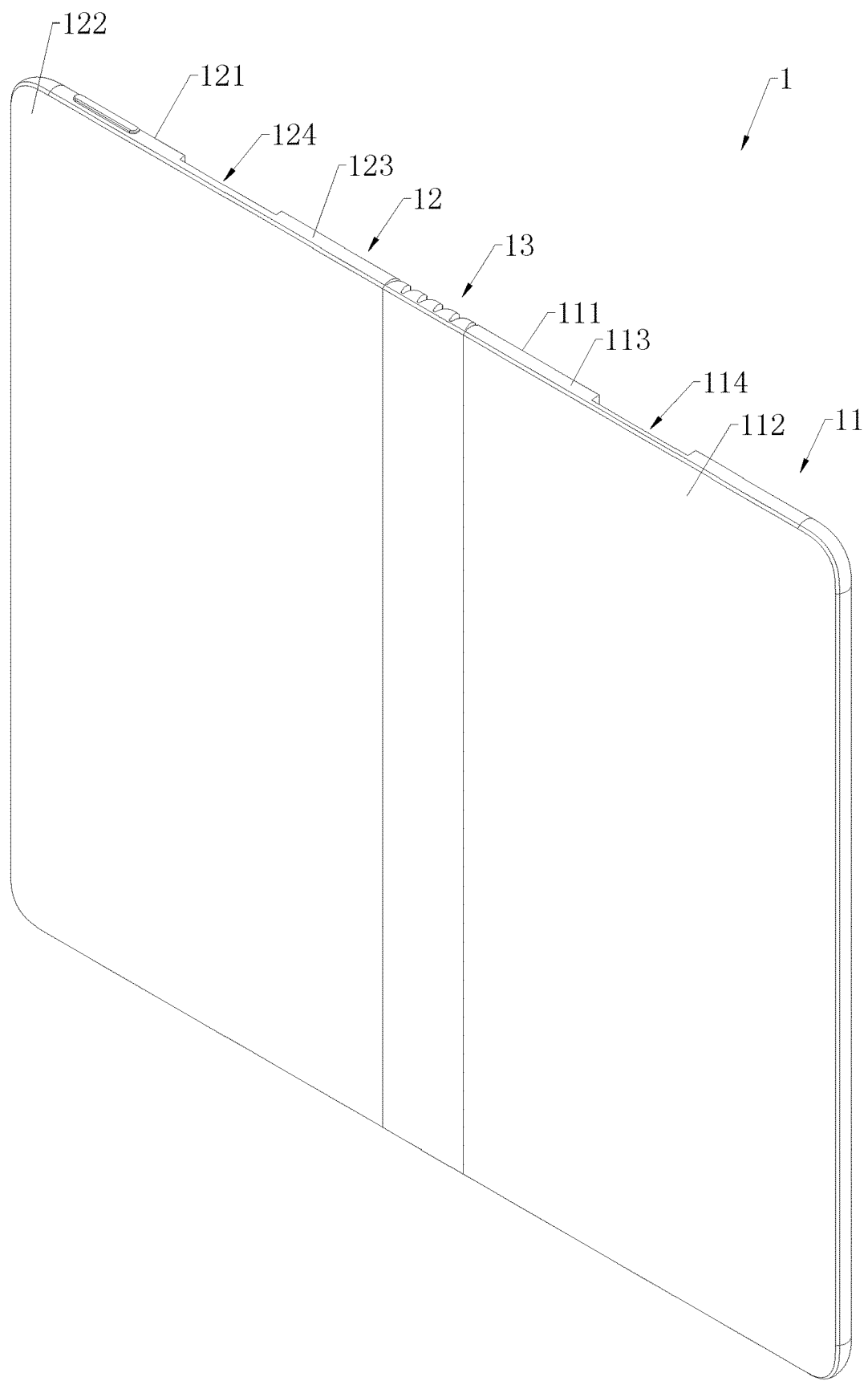
FIG. 3 is a schematic structural view of a support assembly of the mobile terminal in FIG. 1.

Referring to FIG. 2 and FIG. 3 together, the first housing 11 includes a first inner surface 111, a first outer surface 112, and a first circumferential side surface 113. The display screen 2 is carried on the first outer surface 112. The first inner surface 111 is disposed opposite to the first outer surface 112. The first circumferential side surface 113 is connected between the first inner surface 111 and the first outer surface 112. The first housing 11 defines a first recess 114. The first inner surface 111 is recessed toward the first outer surface 112 such that the first recess 114 is defined, and the first recess 114 is extended to the first circumferential side surface 113.

Figure 4:
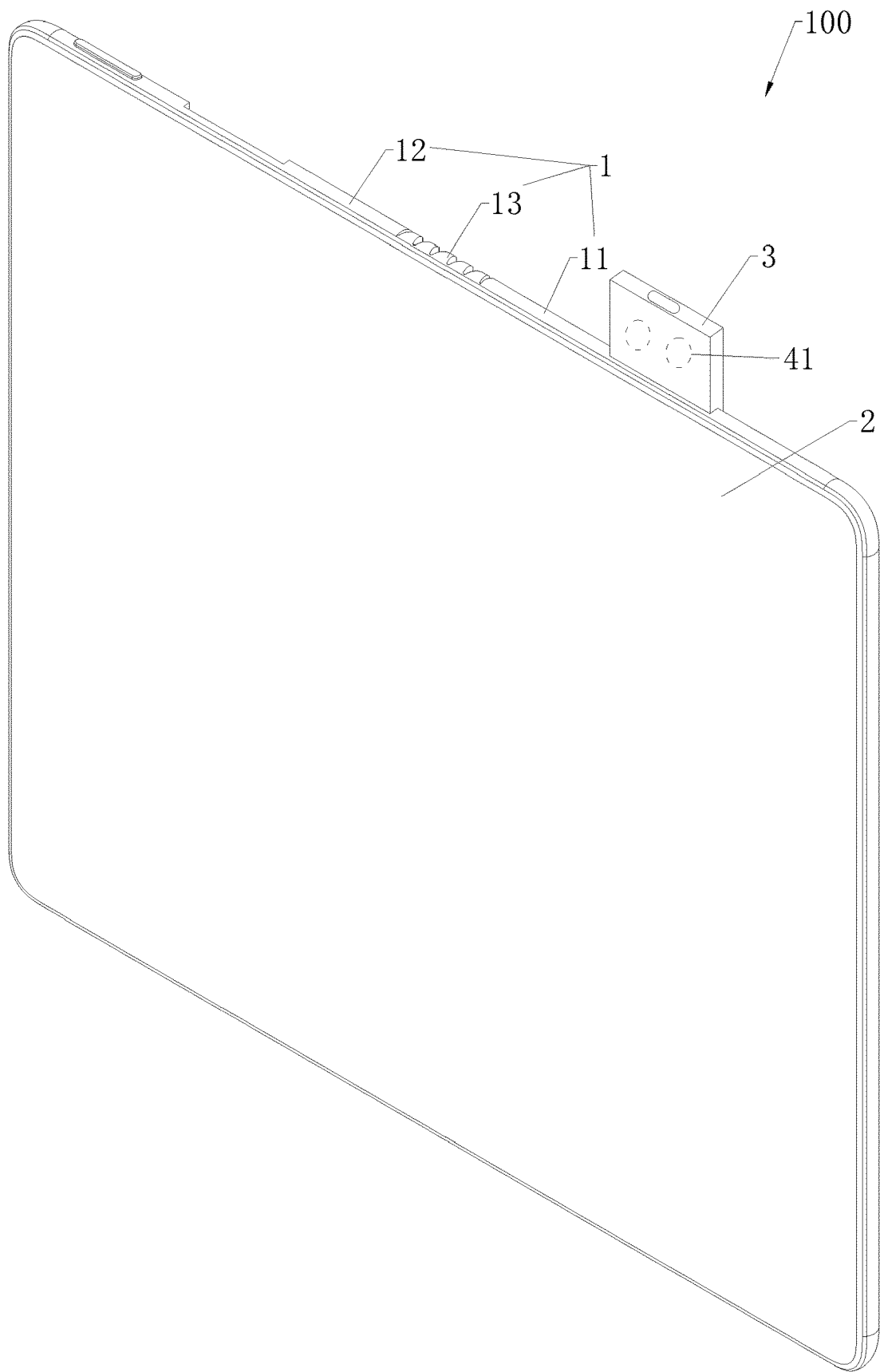
FIG. 4 is a schematic structural view of an arrangement position for a camera of the mobile terminal in FIG. 1 according to an embodiment of the present disclosure.

Referring to FIG. 2 to FIG. 4 together, the movable base 3 is provided with a camera 41. The movable base 3 is movably mounted in the first recess 114. The movable base 3 can carry the camera 41 to move out or retract into the first recess 114 with respect to the first circumferential side surface 113. When the movable base 3 carries the camera 41 to move out the first recess 114 with respect to the first circumferential side surface 113, an image capturing surface of the camera 41 can be exposed. At this time, the camera 41 can perform shooting. When the movable base 3 carries the camera 41 to retract into the first recess 114 with respect to the first circumferential side surface 113, a top surface of the movable base 3 away from the first recess 114 is substantially flush with the first circumferential side surface 113.

Referring to FIG. 1 and FIG. 3 together, the second housing 12 includes a second inner surface 121 and a second outer surface 122. The display screen 2 is carried on the second outer surface 122. The second inner surface 121 is disposed opposite to the second outer surface 122. The second housing 12 defines a second recess 124. When the support assembly 1 is folded, the second inner surface 121 is disposed opposite to the first inner surface 111, and the first recess 114 is covered by the projection of the second recess 124 on the first inner surface 111. The second recess 124 is configured to accommodate a part of the movable base 3.

Figure 5:
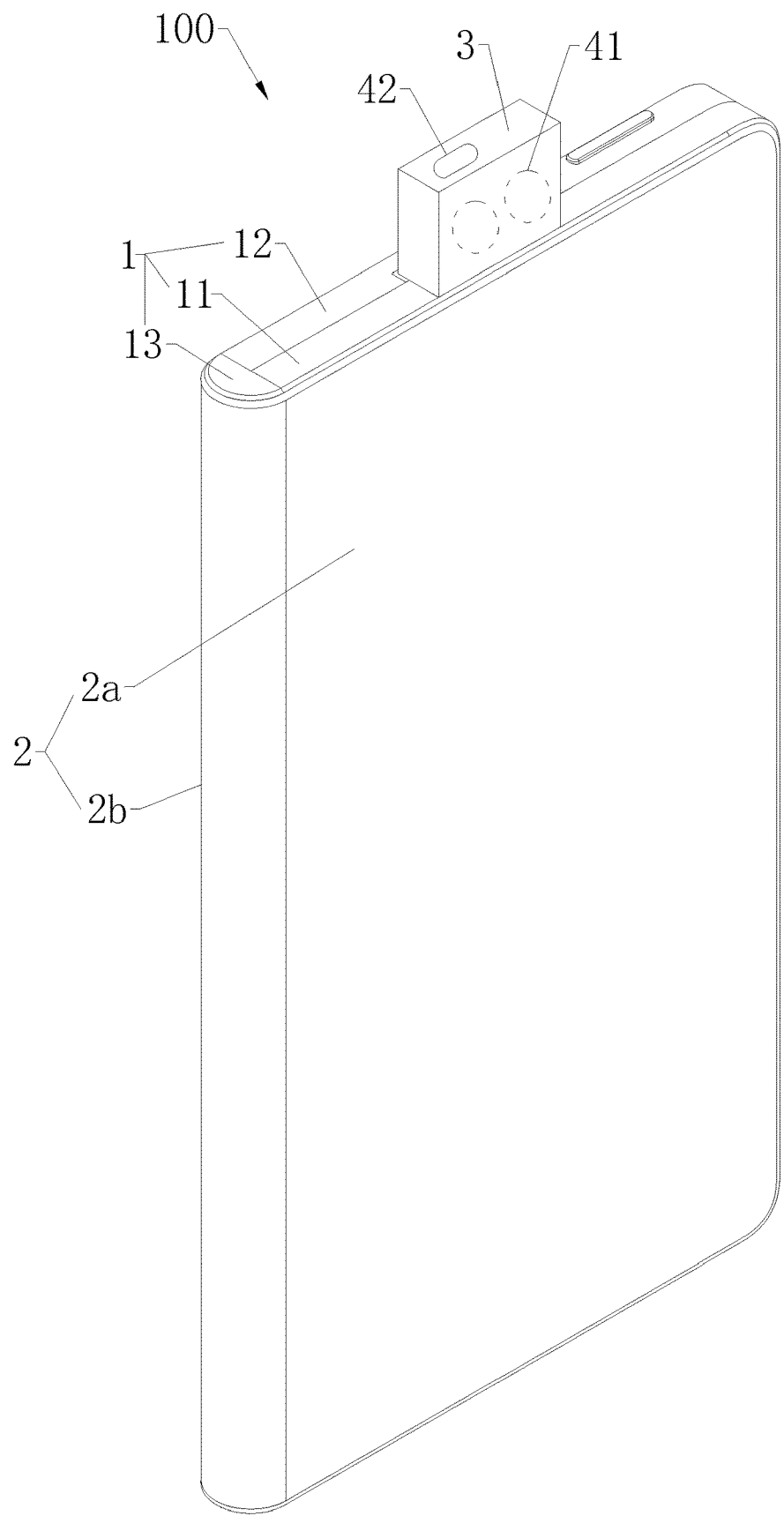
FIG. 5 is a schematic structural view showing the structure of FIG. 4 in a folded state.

In this embodiment, since the movable base 3 can carry the camera 41 to move out or retract into the first recess 114 with respect to the first circumferential side surface 113, as shown in FIG. 4 and FIG. 5, the movable base 3 with the camera 41 is moved out the first recess 114 to take a shooting when the shooting is needed to be performed. As shown in FIG. 1 and FIG. 2, the movable base 3 with the camera 41 is retracted into the first recess 114 when the shooting isn't needed. Thus, the camera 41 does not need to occupy the first outer surface 112 and the second outer surface 122 of the mobile terminal 100, and then the display screen 2 can be arranged as large as possible on first outer surface 112 and the second outer surface 122, which make the screen-to-body ratio of the mobile terminal 100 relatively high.

For example, the screen-to-body ratio of the mobile terminal 100 can be as high as 85% or even 95%. The screen-to-body ratio refers to a ratio of the display area of a screen of the mobile terminal 100 (such as the display screen 2) to the projection area of the entire mobile terminal 100 on a vertical plane of the thickness direction of the mobile terminal 100 when the support assembly 1 is unfolded. In other words, the screen-to-body ratio is also a ratio of the area of the display screen 2 to the first outer surface 112 and the second outer surface 122.

When the support assembly 1 is unfolded, the entire display screen 2 can display, so that the mobile terminal 100 can realize large-screen displaying. When the support assembly 1 is folded, the user may select a part of the display screen 2 laid on the first outer surface 112 or a part of the display screen 2 laid on the second outer surface 122 to display. Thus, the interaction mode of the mobile terminal 100 becomes more diverse, and the user experience becomes better. Moreover, since the second recess 124 is configured for accommodating a part of the movable base 3, the part of the movable base 3 is accommodated in the second recess 124 when the support assembly 1 is folded. Therefore, the overall thickness of the mobile terminal 100 is thin when the support assembly 1 is folded, which is advantageous for achieving lightness and thinness of the mobile terminal 100. Since the first recess 114 is covered by the projection of the second recess 124 on the first inner surface 111, not only the movable base 3 can be well accommodated in the second recess 124, but also the second inner surface in the second recess 124 does not hinder the movement of the movable base 3, so that the movable base 3 can be smoothly moved out or retracted into the first recess 114 when the support assembly 1 is folded.

In this embodiment, the camera 41 may be housed inside the mobile terminal 100 when it is not in use such that it is protected by surrounding structures (for example, the first housing 11 and the second housing 12), and may be moved out the mobile terminal 100 to perform shooting when it is needed to be used, avoiding problems such as wear and ash entering due to long-term exposure, and then effectively ensuring the shooting quality of the camera 41.

It can be understood that, "an image capturing surface of the camera 41 can be exposed" means that the image capturing surface of the camera 41 is not blocked by components of the mobile terminal 100 that have a light blocking effect (for example, the display screen 2 and the like), and then the shooting may be performed smoothly. Of course, it is still allowable that the image capturing surface of the camera 41 is covered by a light-transmitting lens or the like to achieve a protection function.

Figure 6:
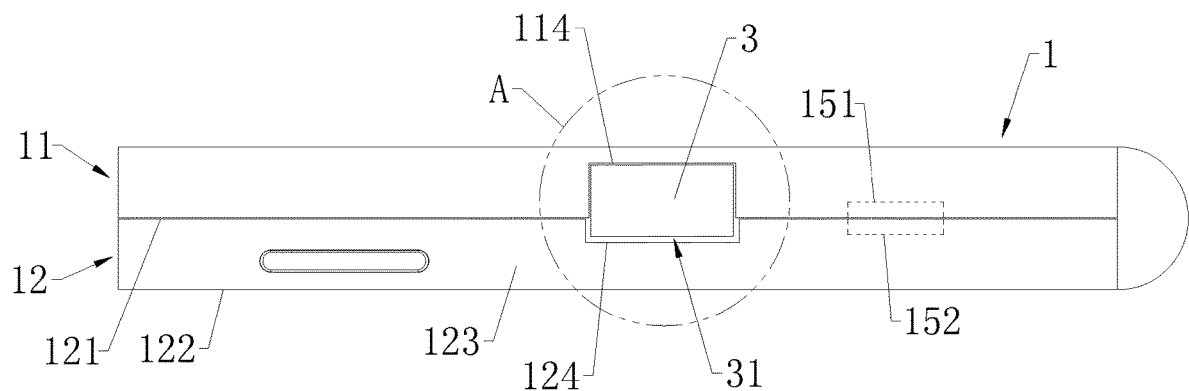
FIG. 6 is a plan view of the mobile terminal of FIG. 1.

Referring to FIG. 3 and FIG. 6 together, the second housing 12 further includes a second circumferential side surface 123. The second circumferential side surface 123 is connected between the second inner surface 121 and the second outer surface 122. The second inner surface 121 is recessed toward the second outer surface 122 such that the second recess 124 is defined. The second recess 124 is extended to the second circumferential side surface 123. When the support assembly 1 is folded, an opening of the first recess 114 on the first circumferential side surface 113 is in communication with an opening of the second recess 124 on the second circumferential side surface 123. Those two openings can be combined into one outlet through which the movable base 3 is moved out or retracted into the first recess 114.

The bendable member 13 can have various implementations, such as an elastic plate structure, a hinge structure, a shaft connecting structure and the like.

Referring to FIG. 6 together, in an embodiment, when a part of the movable base 3 is accommodated in the second recess 124, a first gap 31 is defined between the movable base 3 and the second inner surface 121 in the second recess 124. Specifically, a portion of the outer sidewall of the movable base 3 that is accommodated in the second recess 124 is spaced apart from the recess-wall of the second recess 124, and those do not contact with each other such that the first gap 31 is defined therebetween.

In the present disclosure, since the first gap 31 is defined between the movable base 3 and the second inner surface 121 in the second recess 124, the second inner surface 121 in the second recess 124 is not resistant to the movable base 3 when the movable base 3 moves, such that the movable base 3 can be moved out or retracted into the first recess 114 more smoothly.

It call be understood that, the width of the first gap 31 between the different regions of the outer sidewall of the movable base 3 and the second inner surface 121 in the second recess 124 is not necessarily equal. That is, widths at different regions of the first gap 31 are not necessarily equal. In one embodiment, the widths at different regions of the first gap 31 are uniform. The width of the first gap 31 refers to the vertical distance between the second inner surface 121 in of the second recess 124 and the outer sidewall of the movable base 3.

Figure 7:
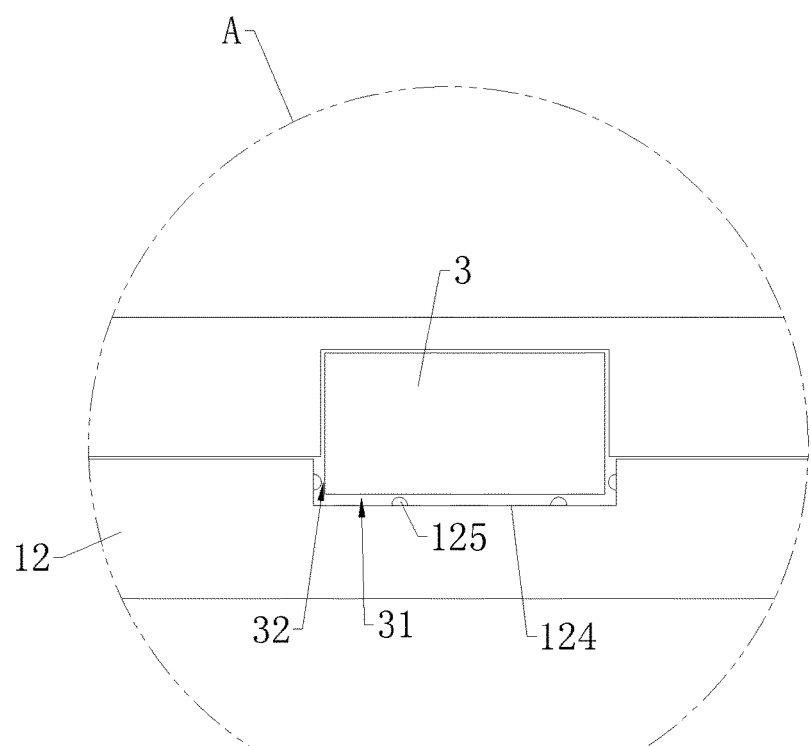
FIG. 7 is a schematic view of the structure at A in FIG. 6 according to an embodiment of the present disclosure.

Referring to FIG. 7 together, in an embodiment, the second housing 12 further includes a plurality of protrusions 125. The plurality of protrusions 125 are spaced apart from each other on the second inner surface 121 in the second recess 124. The plurality of protrusions 125 may be arranged at substantially equal intervals on the second inner surface 121 in the second recess 124. A second gap 32 is defined between the plurality of protrusions 125 and the movable base 3, and the second gap 32 is smaller than the first gap 31.

In this embodiment, the second gap 32 is defined such that the plurality of protrusions 125 do not generate resistance to the movable base 3, and then the movable base 3 can still smoothly be moved out or retracted into the first recess 114. The second gap 32 is smaller than the first gap 31 such that a gap between the outer sidewall of the movable base 3 and the plurality of protrusions 125 is reduced. When the mobile terminal 100 is dropped or subjected to an impact, the plurality of protrusions 125 can abut the movable base 3 and limit the movable base 3 to prevent demage of a driving structure and the like, which is caused as the movable base 3 is displaced too much.

In the present disclosure, the movable base 3 can be slidably or rotatably moved out or retracted into the first recess 114.

Figure 8:
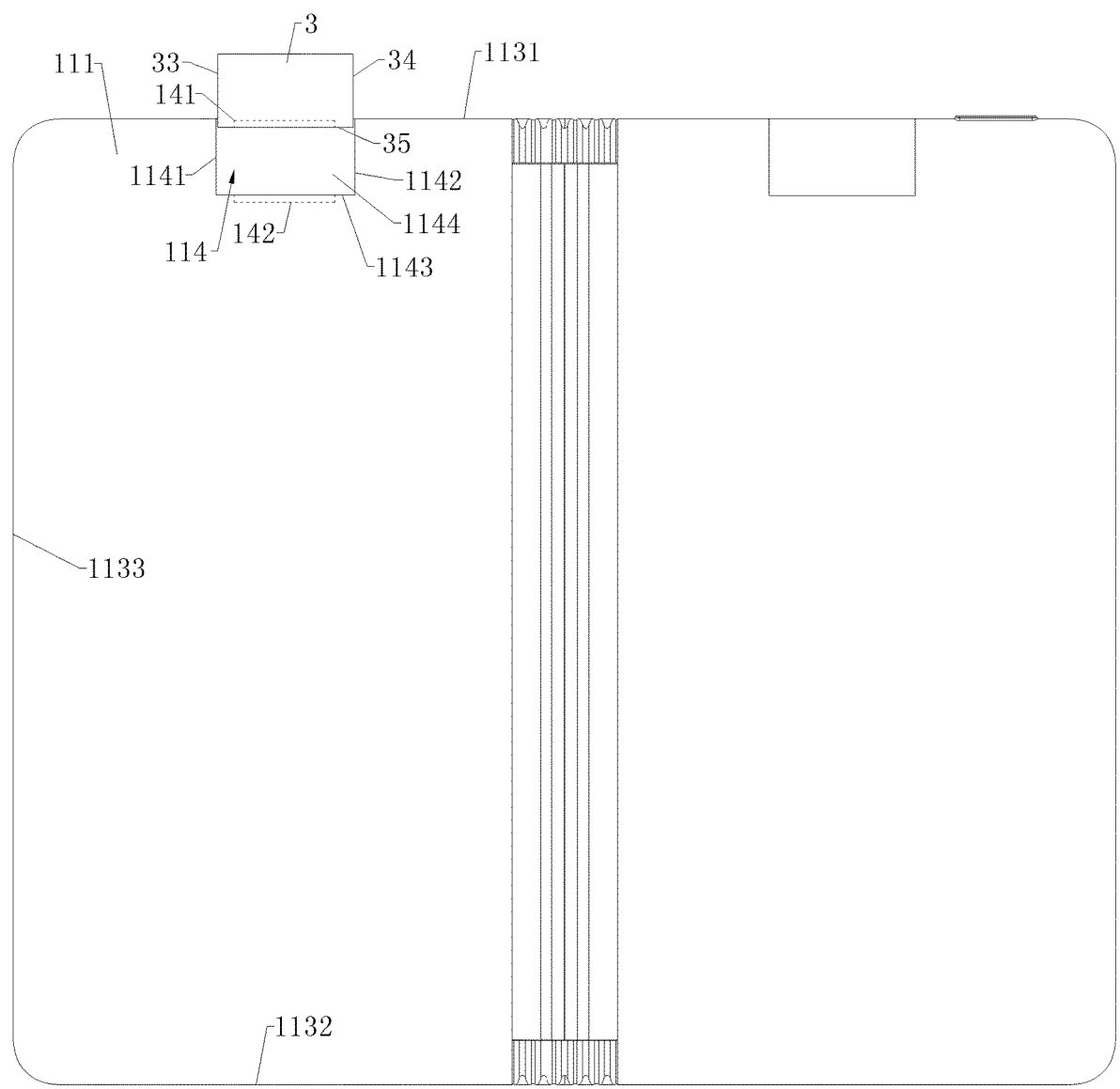
FIG. 8 is a schematic structural view of the mobile terminal of FIG. 1 in an unfolded state from another angle.
Figure 9:
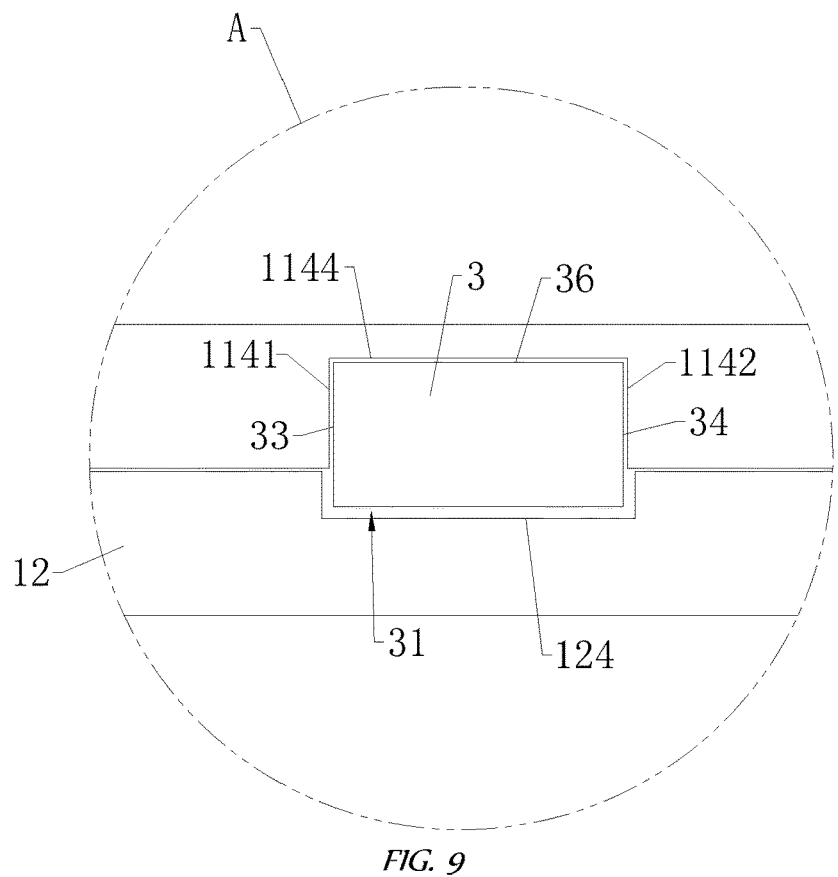
FIG. 9 is a schematic view of the structure at A in FIG. 6 according to another embodiment of the present disclosure.

For example, in one embodiment, referring to FIG. 8 and FIG. 9 together, the first housing 11 includes a first sidewall 1141 and a second sidewall 1142 disposed opposite to each other, and the first sidewall 1141 and the second sidewall 1142 are in the first recess 114. The first sidewall 1141 and the second sidewall 1142 are substantially parallel. The movable base 3 is slidably connected to the first sidewall 1141 and the second sidewall 1142 to slide out or slide into the first recess 114. Specifically, the movable base 3 includes a first outer sidewall 33 and a second outer sidewall 34 which are disposed opposite to each other. The first outer sidewall 33 is slidably connected to the first sidewall 1141. The second outer sidewall 34 is slidably connected to the second sidewall 1142.

In this embodiment, the first sidewall 1141 and the second sidewall 1142 play a guiding role on the movable base 3, and the moving direction of the movable base 3 and the extending directions of the first side wall 1141 and the second sidewall 1142 is substantially the same.

The first housing 11 further includes a third sidewall 1143 and a bottom wall 1144, and the third sidewall 1143 and the bottom wall 1144 are in the first recess 114. The third sidewall 1143 is connected between the first sidewall 1141 and the second sidewall 1142, and the third sidewall 1143 is spaced apart from the first circumferential side surface 113. The bottom wall 1144 is connected between the first sidewall 1141 and the second sidewall 1142, and the bottom wall 1144 is further connected between the third sidewall 1143 and the first circumferential side surface 113.

The movable base 3 further includes a third outer sidewall 35 and a bottom wall 36. The third outer sidewall 35 is connected between the first outer sidewall 33 and the second outer sidewall 34. When the movable base 3 is retracted into the first recess 114, the third outer sidewall 35 can abut the third sidewall 1143, and the third sidewall 1143 limits the movable base 3. The bottom wall 36 is connected to the first outer sidewall 33, the second outer sidewall 34, and the third outer sidewall 35. The bottom wall 36 is slidably connected to the bottom wall 1144. The bottom wall 1144 supports the movable base 3.

The mobile terminal 100 further includes a first driving assembly. The first driving assembly is configured to drive the movable base 3 to slide out or slide into the first recess 114. The first driving assembly is partially fixed to the movable base 3 and partially accommodated inside the first housing 11. The first driving assembly has multiple implementations.

For example, referring to FIG. 8, the first driving assembly includes a permanent magnet 141 and an electromagnet 142. The permanent magnet 141 is fixed to the movable base 3. The permanent magnet 141 may be embedded in the third outer sidewall 35. The electromagnet 142 is fixed to the first housing 11. The electromagnet 142 can be disposed adjacent to the third sidewall 1143, for example, the electromagnet 142 is embedded in the third sidewall 1143. When the electromagnet 142 is energized, the electromagnet 142 repels or attracts the permanent magnet 141 to make the movable base 3 slide out or into the first recess 114. The electromagnet 142 includes an iron block and a coil wound around the outer circumference of the iron block. The magnetic field of the electromagnet 142 is varied by controlling the flow of current in the coil.

Alternatively, the first driving assembly includes a slider, a screw, and a motor. The slider is fixed to the movable base 3. The screw and the motor are housed inside the first housing 11. The outer peripheral side of the screw has a spiral groove. The slider is partially embedded in the spiral groove to be slidably connected to the screw. The slider can be substantially strip-shaped. One end of the slider is fixed to the movable base 3, and the other end of the slider is embedded in the spiral groove. The motor is used to drive the screw to rotate, so that the slider carries the movable base 3 to slide. For example, when the motor drives the screw to rotate in a first direction, the slider carries the movable base 3 to slide away from the third sidewall 1143 under the driving of the screw, such that the movable base 3 is moved out the first recess 114. When the motor drives the screw to rotate in a second direction opposite to the first direction, the slider carries the movable base 3 to slide toward the third sidewall 1143 under the driving of the screw, such that the movable base 3 is retracted into the first recess 114. The actions of the motor (including the direction of rotation, the rotational speed, the angle of rotation, etc.) can be adjusted according to the requirements of the user.

Alternatively, the first driving assembly includes a sleeve, a driving-rod, and a motor. The sleeve is fixed to the movable base 3. The driving-rod and the motor are housed inside the first housing 11. The sleeve is sleeved outside the driving-rod and screwed to the driving-rod. The sleeve rotates with respect to the driving-rod and moves with respect to the first housing 11. The motor is used to drive the driving-rod to rotate, so that the sleeve carries the movable base 3 to slide. When the motor drives the driving-rod to rotate in a third direction, the sleeve carries the movable base 3 to slide away from the third sidewall 1143 under the driving of the driving-rod, such that the movable base 3 is moved out the first recess 114. When the motor drives the driving-rod to rotate in a fourth direction opposite to the third direction, the sleeve carries the movable base 3 to slide toward the third sidewall 1143 under the driving of the driving-rod, such that the movable base 3 is retracted into the first recess 114. The actions of the motor (including the direction of rotation, the rotational speed, the angle of rotation, etc.) can be adjusted according to the requirements of the user.

Alternatively, the first driving assembly includes a rack, a gear, and a motor. The rack is fixed to the movable base 3. The gear and the motor are housed inside the first housing 11. The gear meshes with the rack. The gear is housed inside the first housing 11. One end of the rack is fixed to the movable base 3, and the other end of the rack is extended into the first housing 11. The motor is housed inside the first housing 11. The motor is configured to drive the gear to rotate such that the rack carries the movable base 3 to slide. When the motor drives the gear to rotate in a fifth direction, the rack carries the movable base 3 to slide away from the third sidewall 1143 under the driving of the gear, so that the movable base 3 is moved out the first recess 114. When the motor drives the gear to rotate in a sixth direction opposite to the fifth direction, the rack carries the movable base 3 to slide toward the third sidewall 1143 under the driving of the gear, such that the movable base 3 is retracted into the first recess 114. The actions of the motor (including the direction of rotation, the rotational speed, the angle of rotation, etc.) can be adjusted according to the requirements of the user.

There may be a plurality of the first driving assemblies, and the plurality of the first driving assemblies are arranged at intervals to drive the movable base 3 more smoothly.

Figure 10:
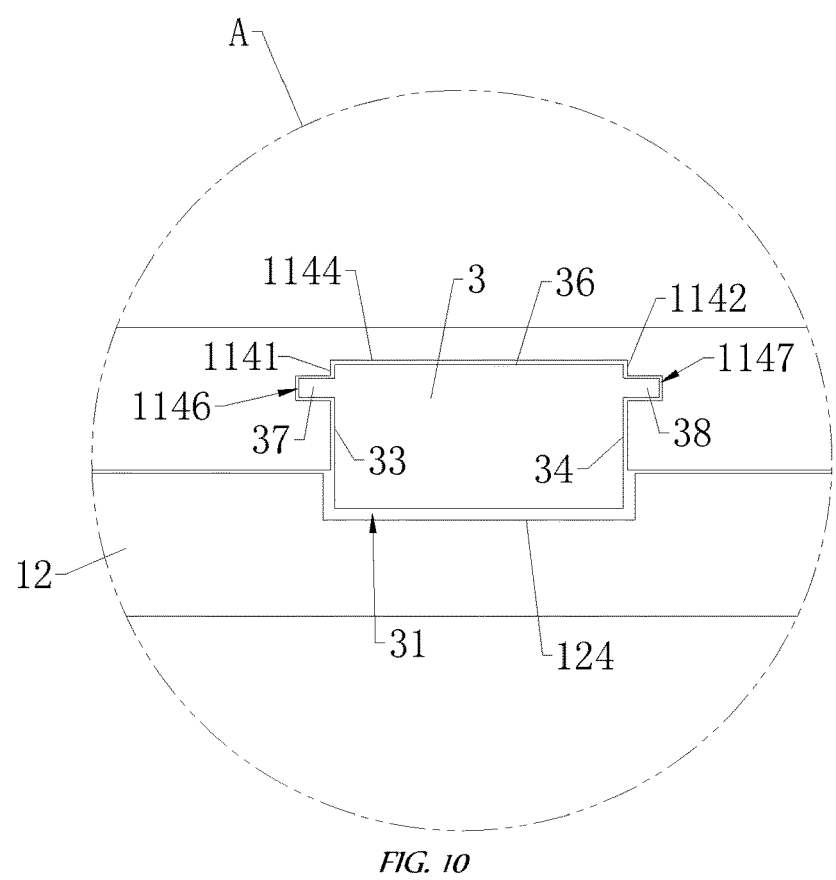
FIG. 10 is a schematic view of the structure at A in FIG. 6 according to still another embodiment of the present disclosure.

Referring to FIG. 10 together, the first sidewall 1141 is provided with a recessed first guiding rail 1146. The second sidewall 1142 is provided with a recessed second rail 1147. The extending direction of the second rail 1147 coincides with the extending direction of the first guiding rail 1146. The movable base 3 is provided with a first guiding block 37 and a second guiding block 38 which are disposed opposite to each other. The first guiding block 37 is protruded from the first outer sidewall 33. The second guiding block 38 is protruded from the second outer sidewall 34. The first guiding block 37 is slidably mounted on the first guiding rail 1146. The second guiding block 38 is slidably mounted on the second rail 1147.

In this embodiment, the first guiding rail 1146 limits and guides the first guiding block 37, and the second guiding rail 1147 limits and guides the second guiding block 38. Thus, the movable base 3 can be smoothly slid out or into the first recess 114, and the movable base 3 can also be prevented from being disengaged from the first recess 114 to improve the reliability of the mobile terminal 100.

It can be appreciated that one of the first guiding rail 1146 and the second rail 1147 may also disposed on the first housing 11, and correspondingly, one of the first guiding block 37 and the second guiding blocks 38 is disposed on the movable base 3.

Figure 11:
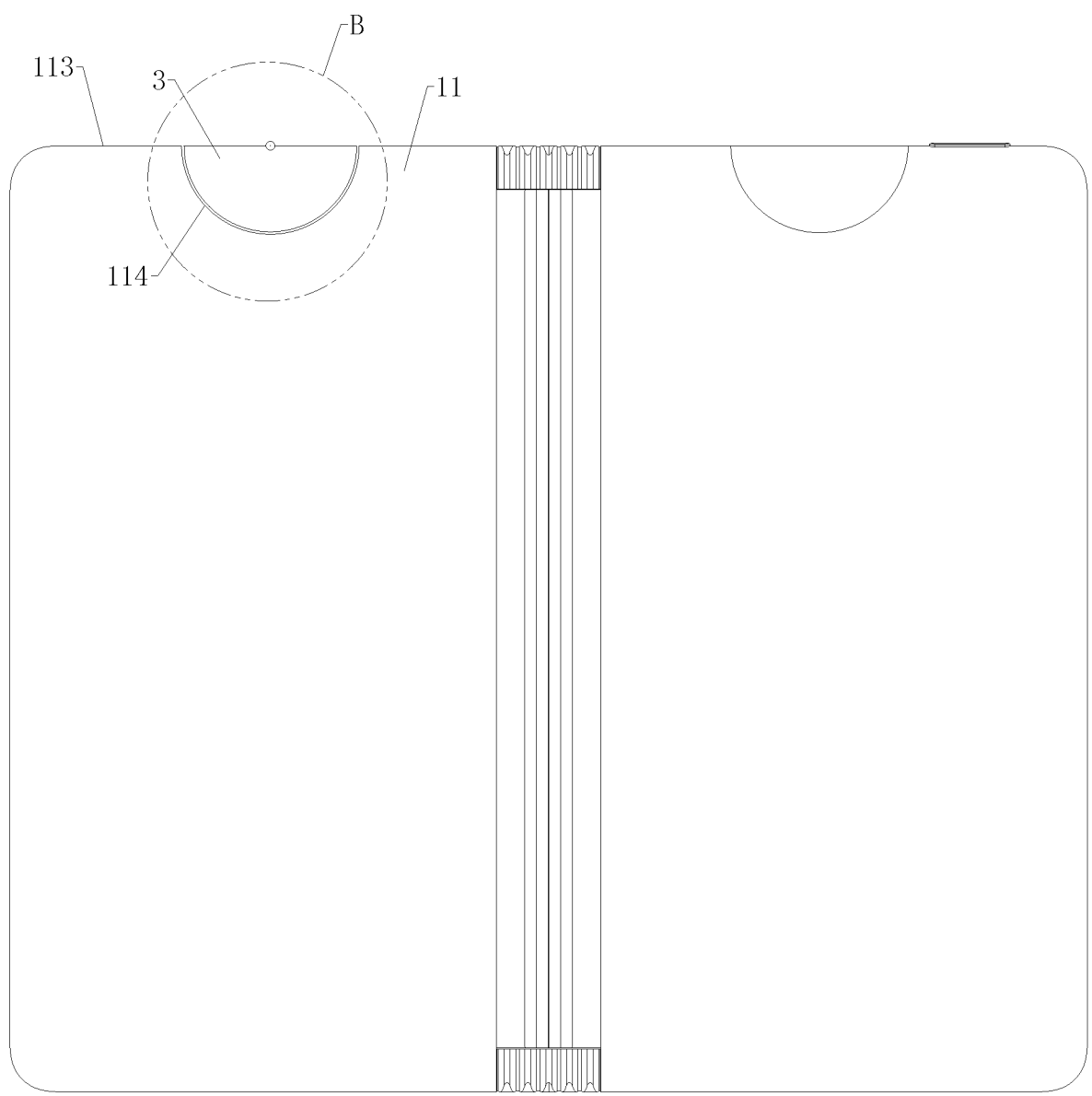
FIG. 11 is a schematic structural view of a mobile terminal according to another embodiment of the present disclosure.
Figure 12:
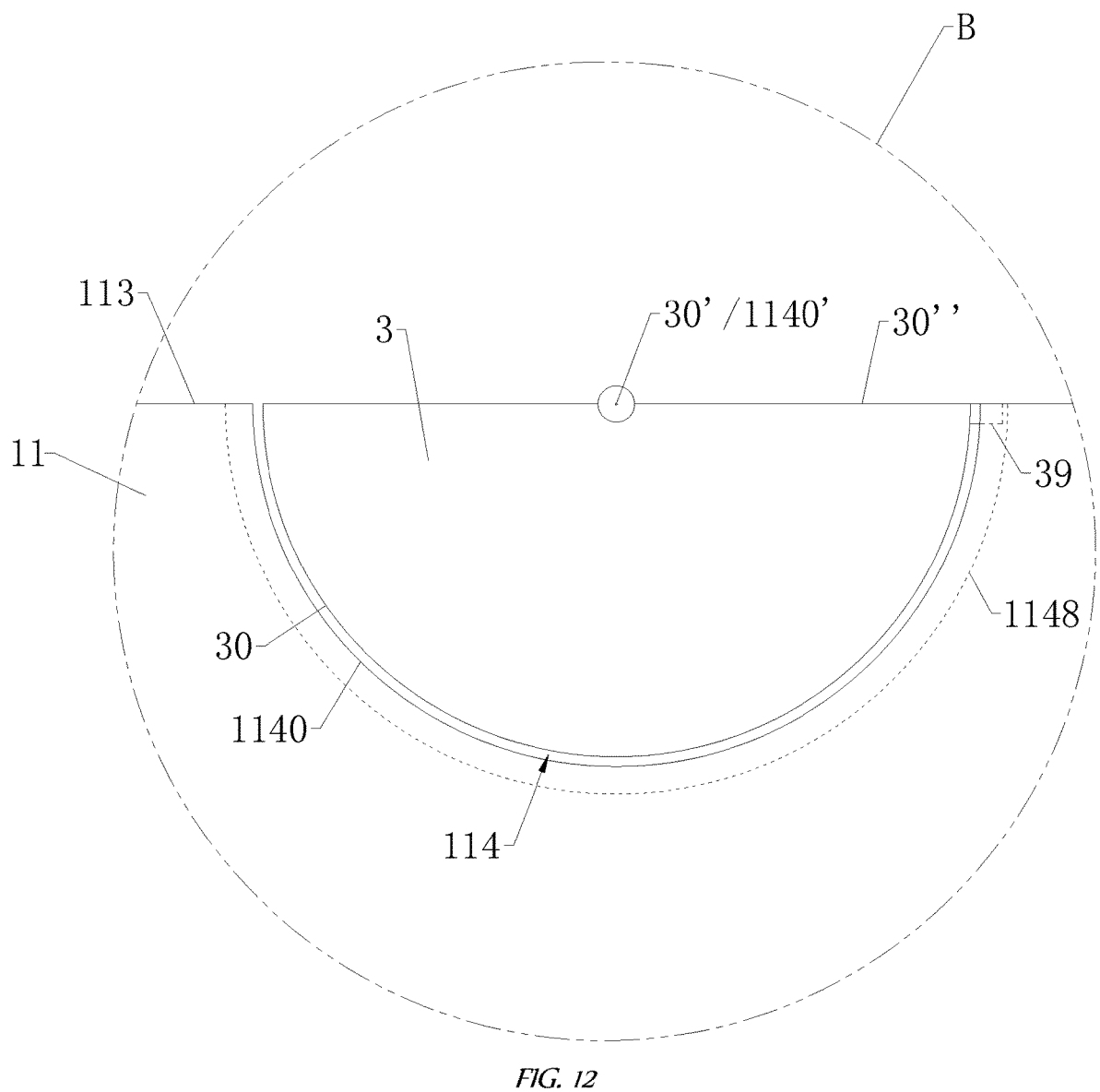
FIG. 12 is an enlarged view of the structure at B in FIG. 11.

In another embodiment, referring to FIG. 11 and FIG. 12 together, the first inner surface 111 in the first recess 114 (which is a portion 1140) is curved. The outer sidewall 30 of the movable base 3 is curved. The outer sidewall 30 of the movable base 3 is disposed opposite to the portion 1140 of the first inner surface 111 in the first recess 114. The outer sidewall 30 of the movable base 3 and the portion 1140 of the first inner surface 111 in the first recess 114 are close to each other and face each other. The movable base 3 is rotatably connected to the first housing 11 to rotate out or rotate into the first recess 114.

In this embodiment, the movable base 3 is rotatably connected to the first housing 11, and the trajectory of the portion 1140 of the first inner surface 111 in the first recess 114 is adapted to the rotational trajectory of the movable base 3. The portion 1140 of the first inner surface 111 in the first recess 114 has an arc shape, the outer sidewall 30 of the movable base 3 has an arc shape, and both shapes are adapted to the rotation trajectory of the movable base 3, so that the movable base 3 can be smoothly rotated into or out of the first recess 114.

The first recess 114 has a semicircular shape. The movable base 3 has a semicircular shape or a fan shape. The rotation-center 30' of the movable base 3 is coincided with the center 1140' for the first recess 114. At this time, the movable base 3 can be rotated more smoothly with respect to the first housing 11. When the movable base 3 is semicircular, the movable base 3 further includes a top sidewall 30" connected to the outer sidewall 30. When the movable base 3 is rotated into the first recess 114, the top sidewall 30" is flush with the first circumferential side surface 113 of the first housing 11. When the movable base 3 is fan-shaped, the movable base 3 further includes a first wall and a second wall connected to the first wall. The first wall and the second wall are connected to both ends of the outer sidewall 30 of the movable base 3. An angle, which is less than 180°, is formed between the first sidewall and the second sidewall.

The first inner surface 111 in the first recess 114 is provided with a recessed guide rail 1148. The outer sidewall of the movable base 3 is provided with a protruded guiding block 39. The guide block 39 is slidably mounted to the guide rail 1148. The guide rail 1148 limits and guides the guiding block 39, so that the movable base 3 can be smoothly rotated out or into the first recess 114, and the movable base 3 can also be prevented from being detached from the first recess 114 to improve the reliability of the mobile terminal 100.

The mobile terminal 100 further includes a second driving assembly. The second driving assembly is configured to drive the movable base 3 to rotate out or into the first recess 114. The second driving assembly includes a motor, a first gear, and a second gear. The motor is configured for driving the first gear to rotate. The second gear meshes with the first gear. The second gear is fixed on a rotating shaft of the movable base 3, and a rotation-center of the second gear is coincided with a rotation-center of the rotating shaft of the movable base 3. The motor drives the movable base 3 to rotate around its rotation shaft through the first gear and the second gear to rotate out or into the first recess 114.

Figure 13:
FIG. 13 is a partial view of the mobile terminal of FIG. 1.

In one embodiment, please referring to FIG. 3, FIG. 6 and FIG. 13 together, a shape of the projection 1240 of the second recess 124 on the first inner surface 111 and a shape of an opening 1145 for the first recess 114 on the first inner surface 111 is same. The projection 1240 is defined by the second recess 124 on the first inner surface 111, which has a first shape. The opening 1145 is defined by first recess 114 on the first inner surface 111, which has a second shape. The first shape is same as the second shape. For example, as shown in FIG. 13, the first shape is a rectangle, and the second shape is a rectangle. Alternatively, the first shape is semi-circular and the second shape is semi-circular. The opening 1145 defined by the first recess 114 on first inner surface 111 is completely covered by the projection of the second recess 124 on the first inner surface 111. That is, the projected area of the second recess 124 on the first inner surface 111 is larger than the area of the opening 1145 of the first recess 114 on the first inner surface 111.

In this embodiment, widths at different regions of the first gap 31 between the movable base 3 and the second inner surface 121 in the second recess 124 are same, so that the appearance of the mobile terminal 100 is consistent. It is also advantageous to improve the reliability of the mobile terminal 100 and avoid interference between the movable base 3 and the first housing 11.

In one embodiment, referring to FIG. 8, the first circumferential side surface 113 includes a first top surface 1131, a first bottom surface 1132, and a first side surface 1133. The first top surface 1131 is disposed opposite to the first bottom surface 1132. The first side surface 1133 is connected between the first top surface 1131 and the first bottom surface 1132. The first recess 114 is extended to one of the first top surface 1131 (shown in FIG. 8), the first bottom surface 1132, and the first side surface 1133. In other words, the movable base 3 can be extended and retracted on the top, the bottom, or the left or right side of the mobile terminal 100.

In the present disclosure, the display screen 2 can be implemented in various ways.

For example, in one embodiment, referring to FIG. 2 and FIG. 3 together, and the display screen 2 is an integrated flexible display screen. The first outer surface 112, the outer surface of the bendable member 13 and the second outer surface 122 collectively carry the display screen 2. The opposite sides of the outer surface of the bendable member 13 are connected to the first outer surface 112 and the second outer surface 122, respectively.

The display screen 2 can be an Organic Light-Emitting Diode (OLED) display.

Figure 14:
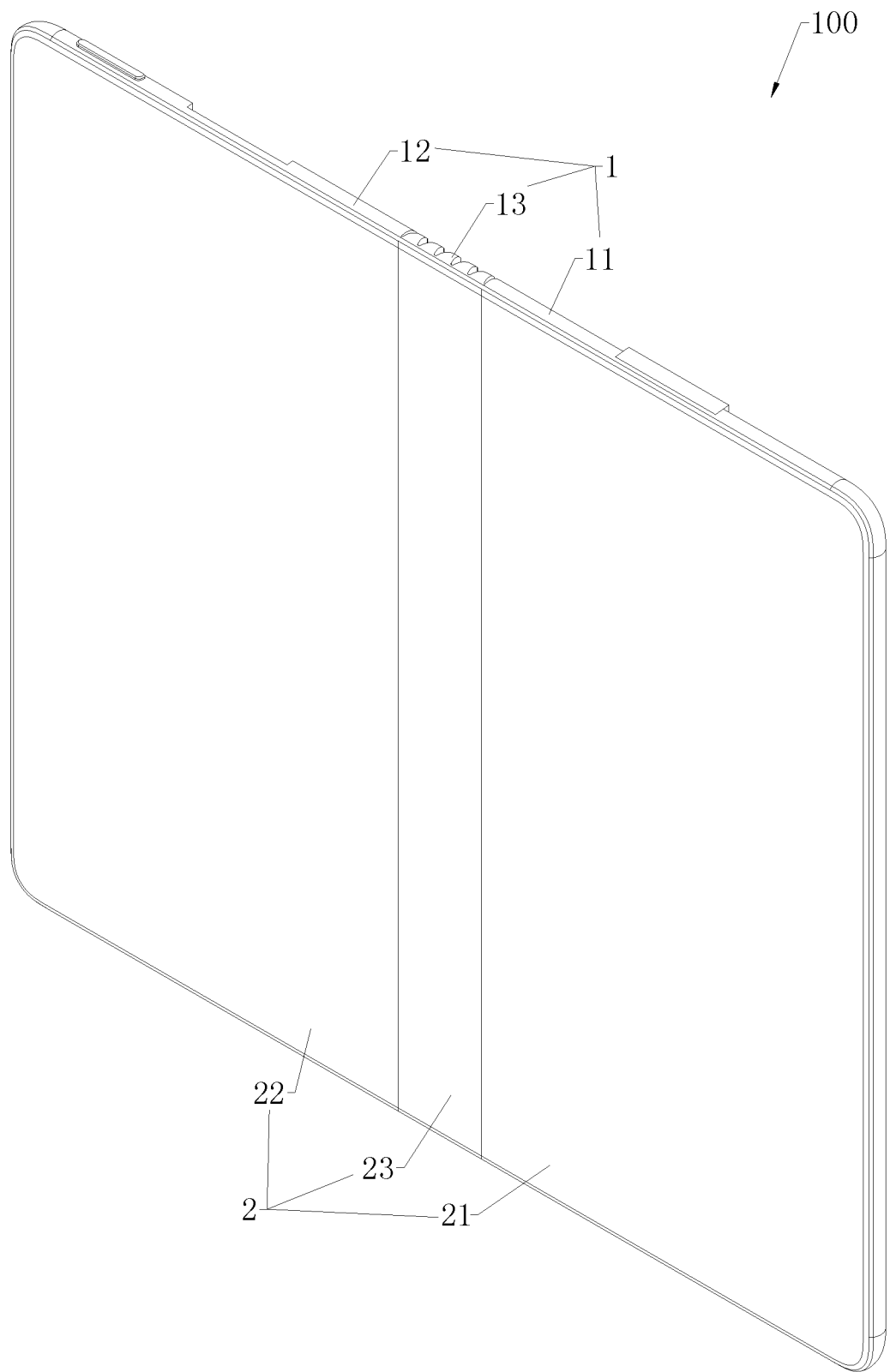
FIG. 14 is a schematic structural view of a mobile terminal according to another embodiment of the present disclosure.

In another embodiment, referring to FIG. 3 and FIG. 14 together, the display screen 2 includes a first sub-display screen 21 and a second sub-display screen 22. The first sub-display screen 21 and the second sub-display screen 22 are two individual display screens. The first sub-display screen 21 is laid on the first outer surface 112. The second sub-display screen 22 is laid on the second outer surface 122. The outer surface of the bendable member 13 can be laid with a third sub-display screen 23, which is flexible. The third sub-display screen 23 is connected to the first sub-display screen 21 and the second sub-display screen 22. Of course, in other embodiments, no display panel may be laid on the outer surface of the bendable member 13.

The first sub-display screen 21 may be a liquid crystal display (LCD) or an organic light-emitting diode (OLED) display. The second sub-display screen 22 may be a liquid crystal display or an organic light emitting diode display. The third sub-display screen 23 can be an organic light emitting diode display screen.

In the present disclosure, referring to FIG. 6 together, the support assembly 1 has a locking structure (151, 152) for making the first housing 11 fixed with respect to the second housing 12 when the support assembly 1 is in a folded state. Thus, it is facilitated for the user to carry the mobile terminal 100. The locking structure (151, 152) has various implementations.

For example, the support assembly 1 further includes a first locking member 151 and a second locking member 152. The first locking member 151 is disposed on the first housing 11. The second locking member 152 is disposed on the second housing 12. When the support assembly 1 is folded, the first locking member 151 is cooperated with the second locking member 152.

The first locking member 151 is a first permanent magnet, and the second locking member 152 is a second permanent magnet. Ends of the first permanent magnet and the second permanent magnet, which face each other, are magnetically opposite. When the support assembly 1 is folded, the first permanent magnet and the second permanent magnet are magnetically attracted.

Alternatively, the first locking member 151 is a block protruded from the first inner surface 111. The second locking member 152 is a slot recessed in the second inner surface 121. When the support assembly 1 is folded, the block is engaged with the slot. The block is interference fitted with the second inner surface 121 in the slot to increase the condensation force therebetween.

In an embodiment, referring to FIG. 5, the movable base 3 further includes at least one of an iris recognition module, a face recognition module, a flash, a microphone (also called a transmitter), and an earpiece 42 (also called a receiver), a photoreceptor, and a fingerprint module. The functional devices (such as the earpiece 42, the photoreceptor, the fingerprint module, etc.) are disposed in the movable base 3 such that they can be deployed with respect to the first housing 11 when they are needed to be used, and be folded with respect to the first housing 11 when they aren't needed to be used. It is not necessary to occupy the design surface space of the mobile terminal 100, so that the display screen 2 can have a larger display area to increase the screen-to-body ratio of the mobile terminal 100. The functional devices housed in the movable base 3 can be arranged alternately to avoid the thickness of the mobile terminal 100 being too large due to overlapping placement.

The number of the cameras 41 in the movable base 3 may be one or more. For example, as shown in FIG. 5, the number of the cameras 41 is two. The shooting directions of the two cameras 41 may be the same (both are front or rear), or may be different (one for the front and one for the rear).

In one embodiment, referring to FIG. 3 and FIG. 4 together, the orientation of the image capturing surface of the camera 41 is same as that of the first outer surface 112. In other embodiments, referring to FIG. 3 and FIG. 15, the orientation of the image capturing surface of the camera 41 is same as that of the first inner surface 111.

In this embodiment, when the orientation of the image capturing surface of the camera 41 is same as that of the first outer surface 112, the camera 41 needs to be moved out the first recess 114 under the driving of the movable base 3 such that it can capture an image and take a shooting, no matter whether the support assembly 1 is in a folded state or an unfolded state. When the orientation of the image capturing surface of the camera 41 is same as that of the first inner surface 111, the support assembly 1 is in an unfolded state, and then the camera 41 can perform shooting after being moved out the first recess 114 or directly perform shooting. The support assembly 1 is in a folded state, and then the camera 41 can perform shooting after being moved out the first recess 114.

It can be understood that when the support assembly 1 is unfolded to a certain angle and the camera 41 isn't blocked by the second housing 12 to capture images, the camera 41 may perform shooting without being protruded from the first recess 114. For example, when the angle at which the support assembly 1 is unfolded is greater than or equal to 90° or 120°.

Figure 16:
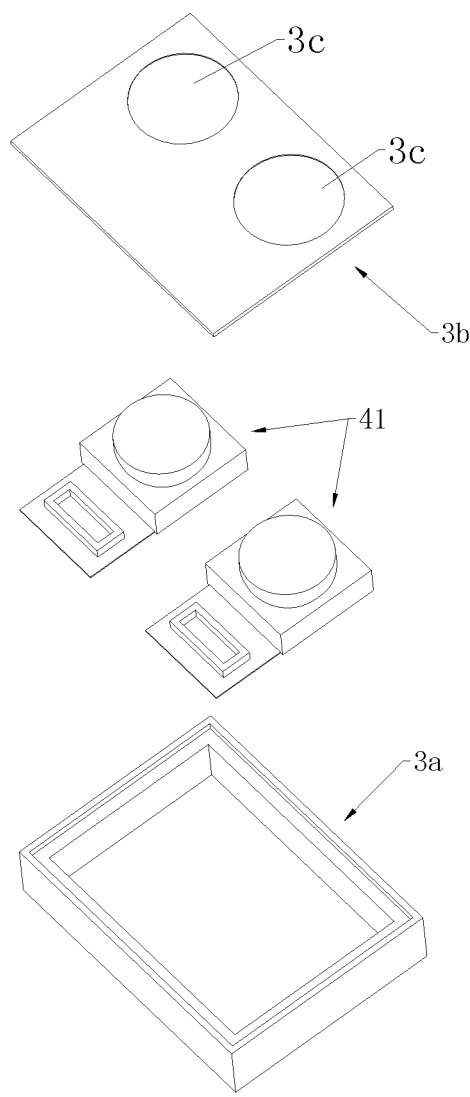
FIG. 16 is an exploded view of a movable base and a camera of the mobile terminal in FIG. 1.

Referring to FIG. 16, the movable base 3 includes a box 3a and a cover plate 3b. The cover plate 3b covers the box 3a. An accommodating space is defined within the moveable seat 3. The camera 41 is accommodated in the accommodating space. The cover plate 3b is provided with a signal penetrating region 3c thereon. The signal penetrating region 3c may be a via, and a transparent lens may be inserted in the via. The image capturing surface of the camera 41 directly faces the signal penetrating region 3c so as to collect light via the signal penetrating region 3c.

In one embodiment, referring to FIG. 1 and FIG. 2 together, the mobile terminal 100 further includes a controller 5, and the controller 5 is accommodated within the first housing 11 or the second housing 12. The controller 5 is electrically connected to the display screen 2. The controller 5 may also be electrically connected to functional devices accommodated in the moveable base 3, for example, the camera 41. The controller 5 is further electrically connected to the first driving assembly or the second driving assembly for driving the movement of the moveable seat 3 so as to control the moveable seat 3 to move out or retract into the first recess 114.

In an embodiment, referring to FIG. 1 and FIG. 2, the first circumferential side surface 113 of the first housing 11 or the second circumferential side surface 123 of the second housing 12 is provided with a triggering button 6. The triggering button 6 is connected (electrically connected and signal-connected) to the controller 5. When the user presses or touches the triggering button 6, the triggering button 6 sends a trigger signal to the controller 5, and the controller 5 controls the first driving assembly or the second driving assembly so that the moveable seat 3 is moved out or retracted into the first recess 114 by the first driving assembly or the second driving assembly when needed. Of course, in other embodiments, both the first circumferential side surface 113 and the second circumferential side surface 123 are provided with a triggering button. The trigger signals may be a shooting signal, a shooting-end signal, an incoming-call signal, an incoming-call end signal, or the like.

In other embodiments, the triggering button may be a touch icon disposed on the display screen 2. The touch icon may be clicked and then a trigger signal is sent to the controller 5. The controller 5 controls the first driving assembly or the second driving assembly to drive the movable base 3 to move based on the trigger signal.

Figure 17:
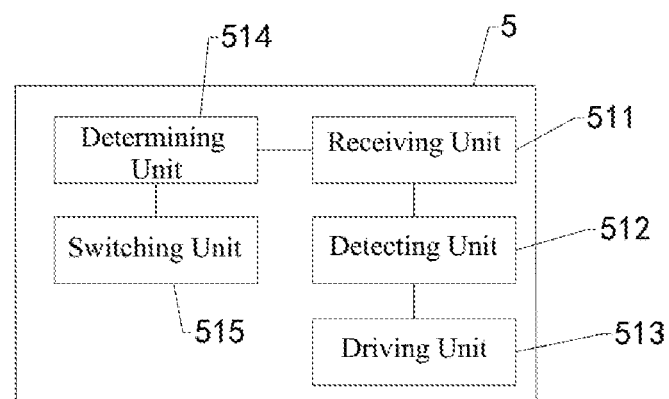
FIG. 17 is a schematic block diagram of a controller of the mobile terminal of FIG. 1 according to an embodiment of the present disclosure.

In one embodiment, referring to FIG. 3, FIG. 5 and FIG. 17 together, the orientation of the image capturing surface of the camera 41 is same as that of the first inner surface 111. The controller 5 includes a receiving unit 511, a detecting unit 512, and a driving unit 513.

The receiving unit 511 is configured to receive a shooting signal.

The detecting unit 512 is configured to detect that the support assembly 1 is in an unfolded state or a folded state based on the shooting signal.

The driving unit 513 is configured to control the camera 41 to take a shooting when the support assembly 1 is in the unfolded state, and drive the movable base 3 to carry the camera 41 to move out the first recess 114 and control the camera 41 to take a shooting when the support assembly 1 is in the folded state.

In this embodiment, the mobile terminal 100 can control the camera 41 to take a shooting directly or after being moved out the first recess 114 according to the support unit 1 in the unfolded state or the folded state. Thus, it ensures the effectiveness of the shooting action, enables the user to obtain an effective captured image, and improves the user experience.

It can be understood that, in other embodiments, the driving unit 513 can also be used to drive the movable base 3 to carry the camera 41 to move out the first recess 114 and control the camera 41 to take a shooting when the support assembly 1 is in the unfolded state.

The receiving unit 511 is further configured to receive a shooting-end signal. The detecting unit 512 is further configured to detect a movable state of the movable base 3 with respect to the first recess 114 based on the shooting-end signal. The driving unit 513 is further configured to drive the movable base 3 to retract into the first recess 114 and then end the shooting of the camera 41 when the movable base 3 is moved out the first recess 114, and end the shooting of the camera 41 when the movable base 3 is retracted into the first recess 114.

The display screen 2 includes a first display area 2a and a second display area 2b. The first display area 2a is overlapped with the first outer surface 112. The second display area 2b is overlapped with the second outer surface 122.

The controller 5 further includes a determining unit 514 and a switching unit 515.

The determining unit 514 is configured to determine that the shooting signal is for front-shooting or rear-shooting.

The switching unit 515 is configured to switch the first display area 2a to display a shooting interface of the camera 41 when the shooting signal is for rear-shooting, and switch the second display area 2b to display the shooting interface of the camera 41 when the shooting signal is for is front-shooting.

In this embodiment, the mobile terminal 100 can flexibly switch the shooting interface of the camera 41 according to the shooting requirements of the user, which improves the shooting experience of the user.

Figure 15:
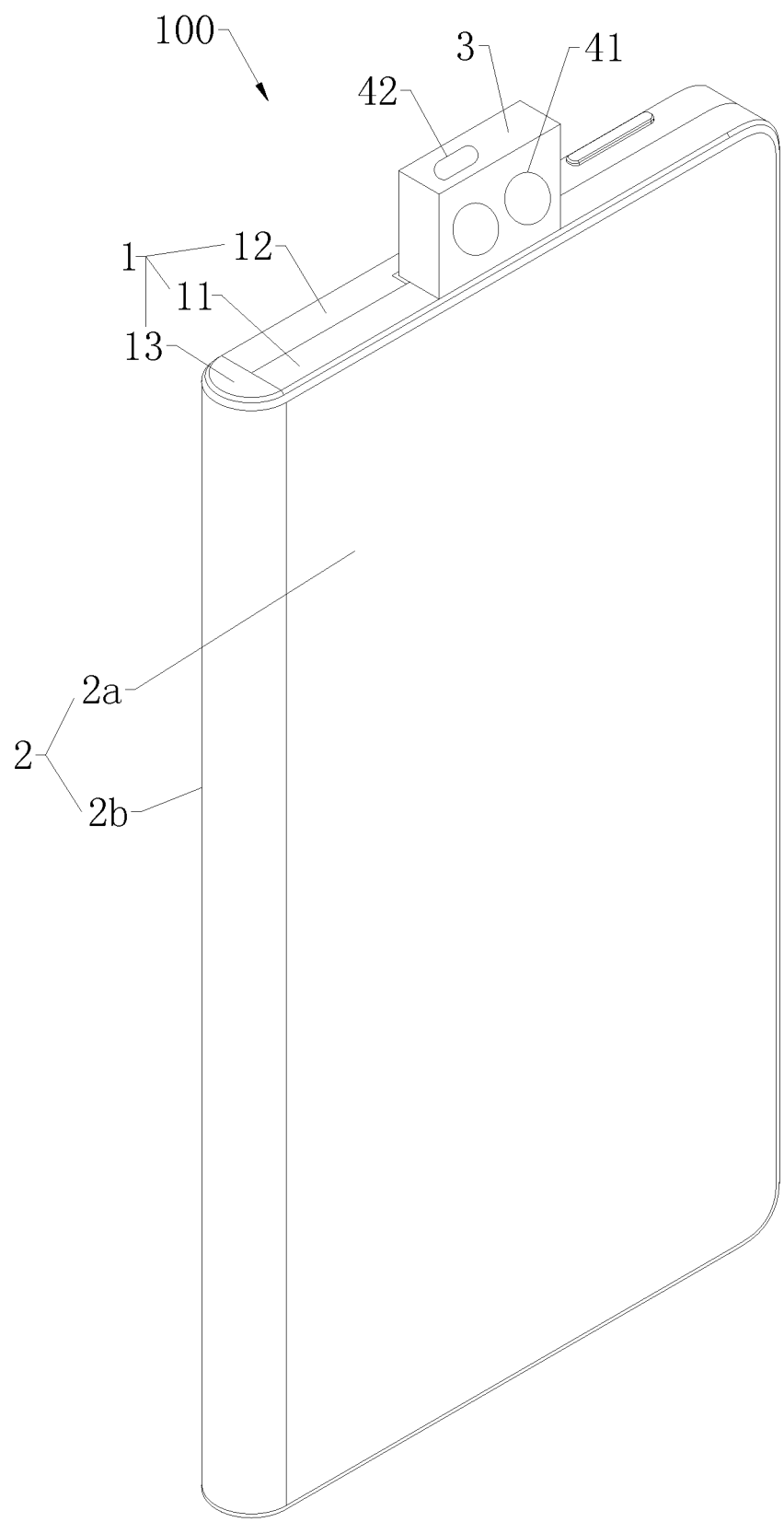
FIG. 15 is a schematic structural view of an arrangement position for a camera of the mobile terminal shown in FIG. 1 according to another embodiment.
Figure 18:
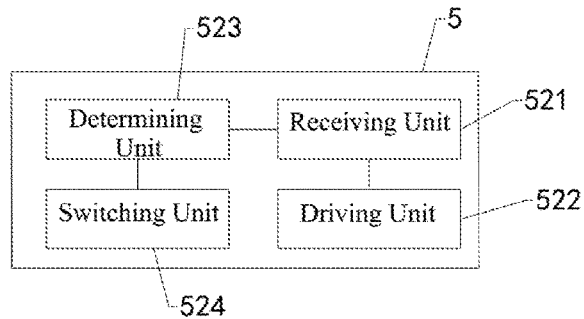
FIG. 18 is a schematic block diagram of a controller of the mobile terminal of FIG. 1 according to another embodiment of the present disclosure.

In another embodiment, referring to FIG. 3, FIG. 15, and FIG. 18 together, the orientation of the image capturing surface of the camera 41 is same as that of the first outer surface 112. The controller 5 includes a receiving unit 521 and a driving unit 522.

The receiving unit 521 is configured to receive a shooting signal.

The driving unit 522 is configured to drive the movable base 3 to carry the camera 41 to move out the first recess 114 based on the shooting signal, and control the camera 41 to perform shooting.

The receiving unit 521 is further configured to receive a shooting-end signal. The driving unit 522 is further configured to drive the movable base 3 to retract into the first recess 114 and end shooting of the camera 41 based on the shooting-end signal.

The display screen 2 includes a first display area 2a and a second display area 2b, the first display area 2a is overlapped with the first outer surface 112, and the second display area 2b is overlapped with the second outer surface 122. The controller 5 further includes a determining unit 523 and a switching unit 524.

The determining unit 523 is configured to determine that the shooting signal is for front-shooting or rear-shooting.

The switching unit 524 is configured to switch the first display area 2a to display a shooting interface of the camera 41 when the shooting signal is front-shooting, and switch the second display area 2b to display the shooting interface of the camera 41 when the shooting signal is for front-shooting.

Figure 19:
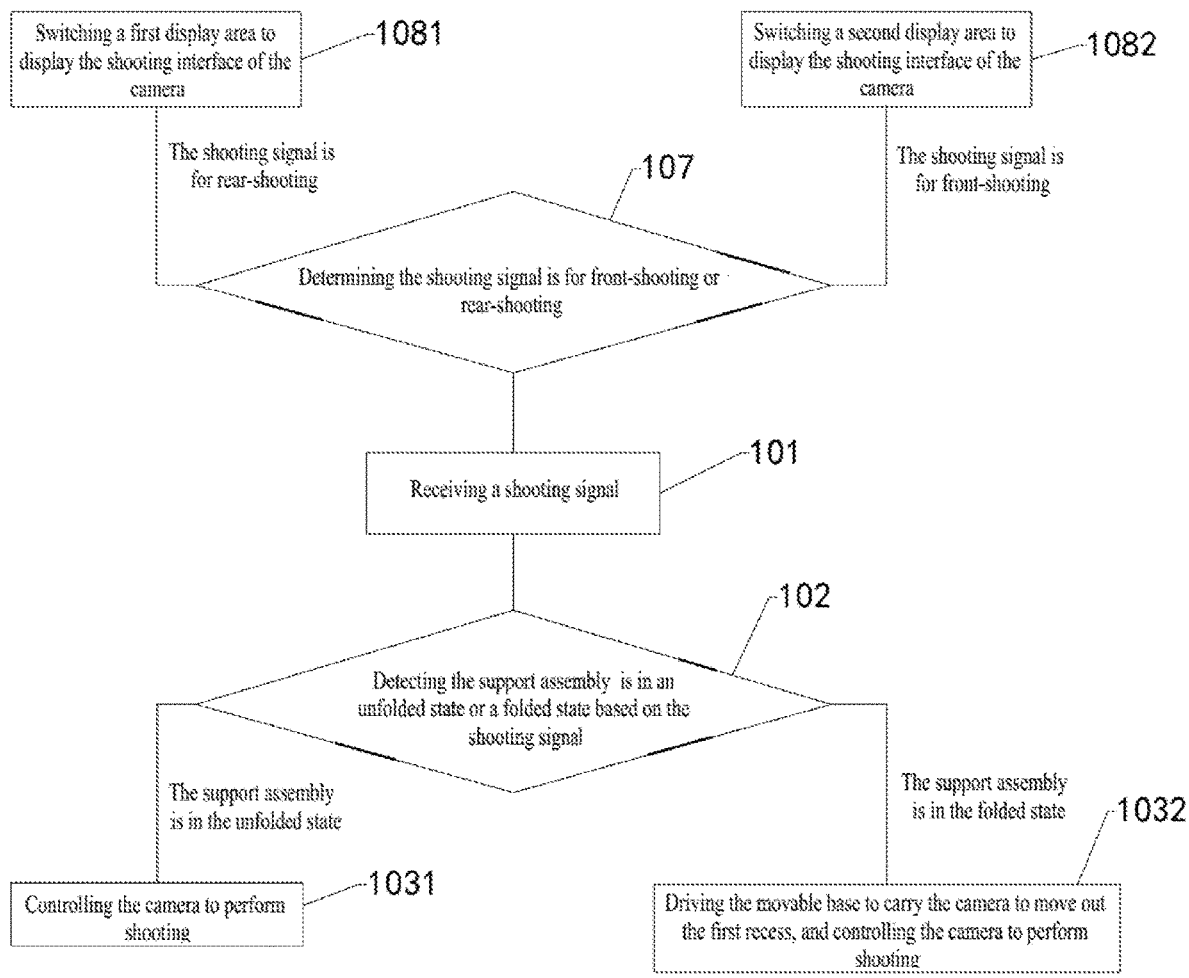
FIG. 19 is a first flow chart of a method for controlling a mobile terminal according to an embodiment of the present disclosure.

Referring to FIG. 19, a method for controlling a mobile terminal is further illustrated in an embodiment of the present disclosure. The method for controlling the mobile terminal is applied to the mobile terminal 100 described in the foregoing embodiments (please referring to FIG. 1 to FIG. 14, FIG. 16, and FIG. 17 together). The mobile terminal 100 includes a support assembly 1, a display screen 2, and a movable base 3. The support assembly 1 includes a first housing 11, a second housing 12, and a bendable member 13. The bendable member 13 is connected between the first housing 11 and the second housing 12, and the bendable member 13 can be unbent or bent to unfold or fold the support assembly 1.

The first housing 11 includes a first inner surface 111, a first outer surface 112, and a first circumferential side surface 113. The display screen 2 is carried on the first outer surface 112. The first inner surface 111 is disposed opposite the first outer surface 112. The first circumferential side surface 113 is connected between the first inner surface 111 and the first outer surface 112. The first housing 11 defines a first recess 114. The first inner surface 111 is recessed toward the first outer surface 112 such that the first recess 114 is defined, and the first recess 114 is extended to the first circumferential side surface 113.

A camera 41 is disposed in the movable base 3. The movable base 3 is movably mounted to the first recess 114. The movable base 3 can carry the camera 41 to move out or retract into the first recess 114 with respect to the first circumferential side surface 113. As shown in FIGS. 4 and 5, the orientation of the image capturing surface of the camera 41 is same as that of the first inner surface 111.

The second housing 12 includes a second inner surface 121 and a second outer surface 122. The display screen 2 is carried on the second outer surface 122. The second inner surface 121 is disposed opposite the second outer surface 122. The second housing 12 defines a second recess 124. When the support assembly 1 is folded, the second inner surface 121 is disposed opposite to the first inner surface 111, and the first recess 114 is covered by the projection of the second recess 124 on the first inner surface 111. The second recess 124 is configured to accommodate a part of the movable base 3.

The method for controlling the mobile terminal includes actions/operations in the following block.

At block 101, a shooting signal is received.

At block 102, the support assembly 1 is in an unfolded state or a folded state is detected based on the shooting signal.

At block 1031, the camera 41 is controlled to perform shooting if the support assembly 1 is in the unfolded state.

At block 1032, the movable base 3 is driven to carry the camera 41 to move out the first recess 114, and the camera 41 is controlled to perform shooting if the support assembly 1 is in the folded state.

In this embodiment, the method for controlling the mobile terminal may control the camera 41 shoot directly or after being moved out the first recess 114 based on whether the support assembly 1 is in an unfolded state or a folded state. Thus, it ensures the effectiveness of the shooting action, enables the user to obtain an effective captured image, and improves the user experience.

It can be appreciated that, in the present disclosure, the mobile terminal 100 can be provided with an angle sensor for detecting an angle between the first housing 11 and the second housing 12 to obtain the state of the support assembly 1. In other embodiments, the mobile terminal 100 may also detect a distance between a certain point of the first housing 11 and a certain point of the second housing 12 by using a distance sensor, and then derive the angle between a housing 11 and the second housing 12 by an algorithm. The method for detecting the angle between the first housing 11 and the second housing 12 is not strictly limited.

Figure 20:
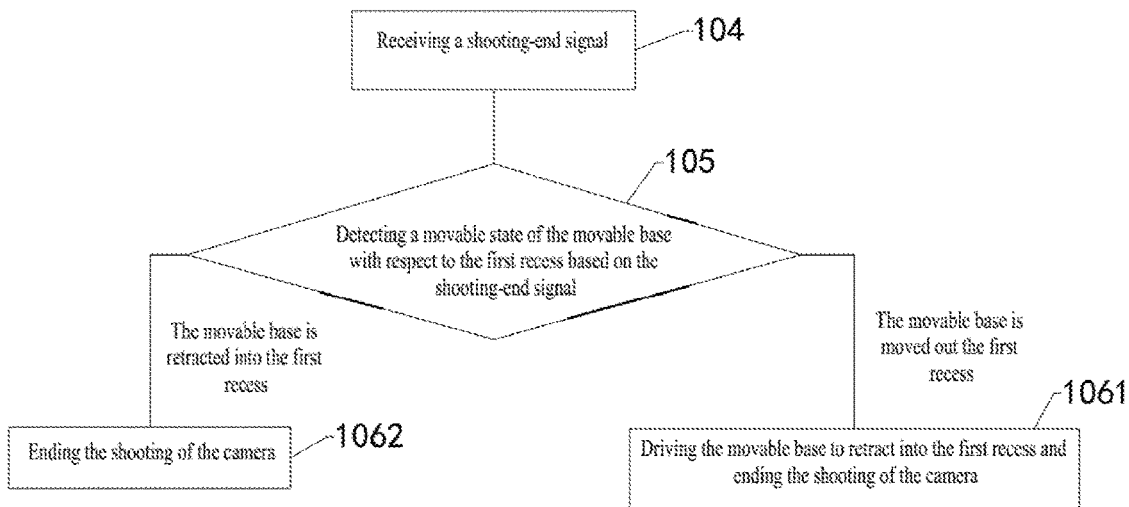
FIG. 20 is a second flow chart of a method for controlling a mobile terminal according to an embodiment of the present disclosure.

Referring to FIG. 20 together, the method for controlling the mobile terminal further includes actions/operations in the following blocks.

At block 104, a shooting-end signal is received.

At block 105, a movable state of the movable base 3 with respect to the first recess 114 is detected based on the shooting-end signal.

At block 1061, the movable base 3 is driven to retract into the first recess 114 and the shooting of the camera 41 is ended if the movable base 3 is moved out the first recess 114.

At block 1062, the shooting of the camera 41 is ended if the movable base 3 is retracted into the first recess 114.

The display screen 2 includes a first display area 2a and a second display area 2b. The first display area 2a is overlapped with the first outer surface 112. The second display area 2b is overlapped with the second outer surface 122.

Referring to FIG. 19, the method for controlling the mobile terminal further includes actions/operations in the following blocks.

At block 107, the shooting signal is for front-shooting or rear-shooting is determined.

At block 1081, the first display area 2a is switched to display the shooting interface of the camera 41 if the shooting signal is for rear-shooting.

At block 1082, the second display area 2b is switched to display the shooting interface of the camera 41 if the shooting signal is front-shooting.

In the present embodiment, the block 107 is performed after the block 101. Blocks 1081 and 1082 are performed prior to the shooting action of the camera 41. For example, they may be performed in synchronization with the block 102, or before blocks 1031 and 1032.

The method for controlling the mobile terminal further includes following actions/operations.

The movable state of the movable base 3 with respect to the first recess 114 is detected when it is detected that an acceleration speed of the mobile terminal 100 reaches a threshold.

The movable base 3 is driven to retract into the first recess 114 if the movable base 3 is moved out the first recess 114.

The mobile terminal 100 further includes a gravity sensor (not shown). The gravity sensor is electrically connected to the controller 5. The gravity sensor is used to detect the acceleration speed of the mobile terminal 100. When the gravity sensor detects that the acceleration speed reaches the threshold, the controller 5 determines that the mobile terminal 100 is in a falling environment or an impact environment, and then detects the telescopic state of the movable base 3 and generates a corresponding action. Thus, it ensures that the movable base 3 is retracted into the first recess 114 to prevent the movable base 3 and the camera 41 from being damaged by the impact.

Figure 21:
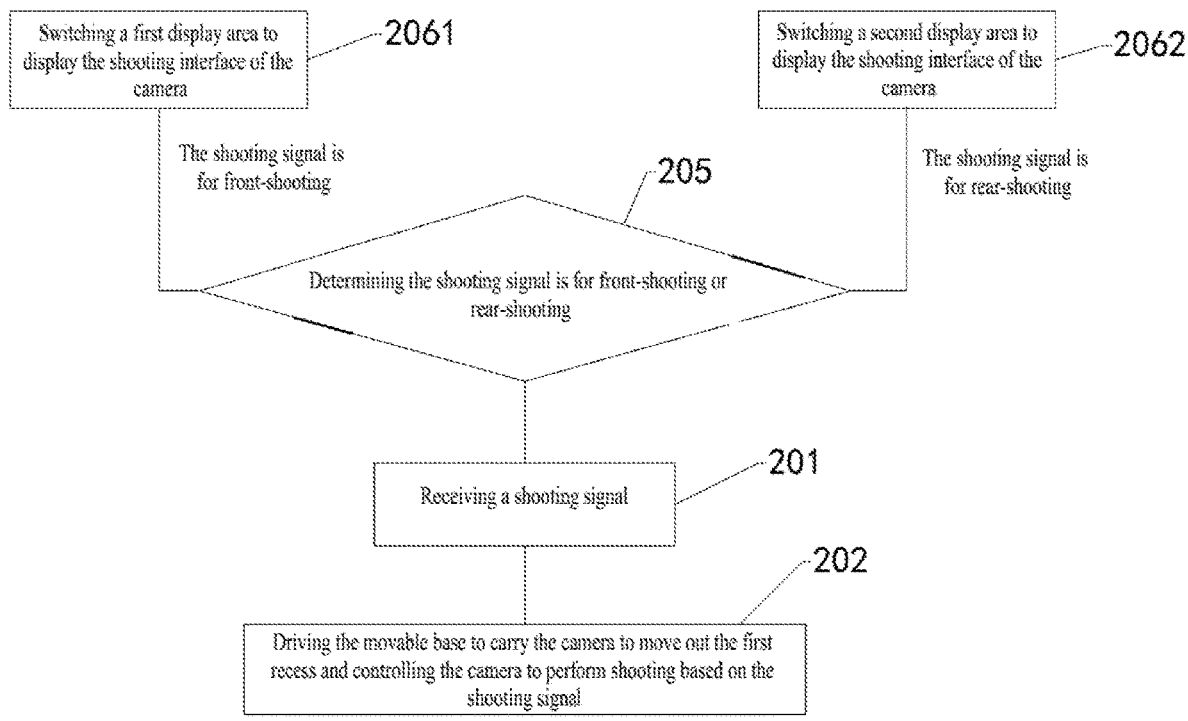
FIG. 21 is a first flow chart of a method for controlling a mobile terminal according to another embodiment of the present disclosure.

Referring to FIG. 21, a method for controlling a mobile terminal is illustrated in another embodiment of the present disclosure. The method for controlling the mobile terminal is applied to the mobile terminal 100 described in the foregoing embodiments (please referring to FIG. 1 to FIG. 3, FIG. 6 to FIG. 16, and FIG. 18 together). The mobile terminal 100 includes a support assembly 1, a display screen 2, and a movable base 3. The support assembly 1 includes a first housing 11, a second housing 12, and a bendable member 13. The bendable member 13 is connected between the first housing 11 and the second housing 12, and the bendable member 13 can be unbent or bent to unfold or fold the support assembly 1.

The first housing 11 includes a first inner surface 111, a first outer surface 112, and a first circumferential side surface 113. The display screen 2 is carried on the first outer surface 112. The first inner surface 111 is disposed opposite the first outer surface 112. The first circumferential side surface 113 is connected between the first inner surface 111 and the first outer surface 112. The first housing 11 defines a first recess 114. The first inner surface 111 is recessed toward the first outer surface 112 such that the first recess 114 is defined, and the first recess 114 is extended to the first circumferential side surface 113.

A camera 41 is disposed in the movable base 3. The movable base 3 is movably mounted to the first recess 114. The movable base 3 can carry the camera 41 to move out or retract into the first recess 114 with respect to the first circumferential side surface 113. As shown in FIG. 15, the orientation of the image capturing surface of the camera 41 is same as that of the first inner surface 111.

The second housing 12 includes a second inner surface 121 and a second outer surface 122. The display screen 2 is carried on the second outer surface 122. The second inner surface 121 is disposed opposite the second outer surface 122. The second housing 12 defines a second recess 124. When the support assembly 1 is folded, the second inner surface 121 is disposed opposite to the first inner surface 111, and the first recess 114 is covered by the projection of the second recess 124 on the first inner surface 111. The second recess 124 is configured to accommodate a part of the movable base 3.

The method for controlling the mobile terminal includes actions/operations in the following blocks.

At block 201, a shooting signal is received.

At block 202, the movable base 3 is driven to carry the camera 41 to move out the first recess 114 based on the shooting signal, and then the camera 41 is controlled to perform shooting.

In this embodiment, the method for controlling the mobile terminal may control the movable base 3 to carry the camera 41 to move out the first recess 114 to perform shooting and meet user interaction requirements when the shooting is required.

Figure 22:
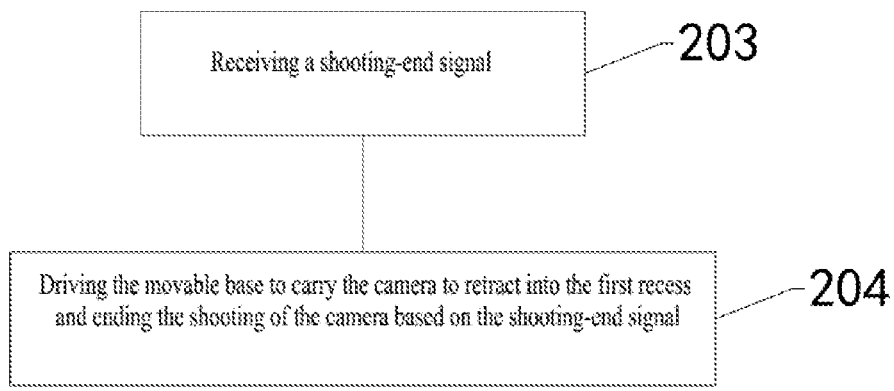
FIG. 22 is a second flow chart of a method for controlling a mobile terminal according to another embodiment of the present disclosure.

Referring to FIG. 22 together, the method for controlling the mobile terminal further includes actions/operations in the following blocks.

At block 203, a shooting-end signal is received.

At block 204, the movable base 3 is driven to retract into the first recess 114 and the shooting of the camera 41 is ended based on the shooting-end signal.

The display screen 2 includes a first display area 2*a* and a second display area 2*b*. The first display area 2*a* is overlapped with the first outer surface 112. The second display area 2*b* is overlapped with the second outer surface 122.

Referring to FIG. 21, the method for controlling the mobile terminal further includes actions/operations in the following blocks.

Block 205, the shooting signal is for front-shooting or rear-shooting is determined.

Block 2061, the first display area 2*a* is switched to display the shooting interface of the camera 41 if the shooting signal is for front-shooting.

Block 2062, the second display area 2*b* is switched to display the shooting interface of the camera 41 if the shooting signal is for rear-shooting.

In the present embodiment, the block 205 is performed after the block 201. Blocks 2061 and 2062 are completed prior to the shooting action of the camera 41. For example, they may be performed in synchronization with the action that the movable base 3 is retracted into the first recess 114, or before block 204.

The method for controlling the mobile terminal further includes following actions/operations.

The movable state of the movable base 3 with respect to the first recess 114 is detected when it is detected that an acceleration speed of the mobile terminal 100 reaches a threshold.

The movable base 3 is driven to retract into the first recess 114 if the movable base 3 is protruded from the first recess 114.

The mobile terminal 100 further includes a gravity sensor (not shown). The gravity sensor is electrically connected to the controller 5. The gravity sensor is used to detect the acceleration speed of the mobile terminal 100. When the gravity sensor detects that the acceleration speed reaches the threshold, the controller 5 determines that the mobile terminal 100 is in a falling environment or an impact environment, and then detects the telescopic state of the movable base 3 and generates a corresponding action. Thus, it ensures that the movable base 3 is retracted into the first recess 114 to prevent the movable base 3 and the camera 41 from being damaged by the impact.

In one embodiment, as shown in FIGS. 1-22, a mobile terminal 100 includes a support assembly 1, a display screen 2, and a movable base 3. The support assembly 1 includes a first housing 11, a second housing 12, and a bendable member 13. The first housing 11 defines a first recess 114, and includes a first inner surface 111, a first outer surface 112 disposed opposite to the first inner surface 111, and a first circumferential side surface 113 connected between the first inner surface 111 and the first outer surface 112. The first inner surface 111 is recessed toward the first outer surface 112 such that the first recess 114 is defined, and the first recess 114 is extended to the first circumferential side surface 113. The second housing 12 defines a second recess 124 and includes a second inner surface 121 opposite to the first inner surface 111 when the support assembly 1 is folded, and a second outer surface 122 disposed opposite to the second inner surface 121. The first recess 114 is covered by a projection of the second recess 124 on the first inner surface 111. The bendable member 13 is connected between the first housing 11 and the second housing 12 and has a capacity of being unbent or bent to unfold or fold the support assembly 1. A part of the display screen 2 is carried on the first outer surface 112, and another part of the display screen 2 is carried on the second outer surface 122. The movable base 3 is movably mounted in the first recess 114. A camera 41 is disposed in the movable base 3, the movable base 3 is able to carry the camera 41 to move out or retract into the first recess 114 with respect to the first circumferential side surface 113, and the second recess 124 is configured to accommodate a part of the movable base 3.

In one example, as shown in FIG. 6, a first gap 31 is defined between an outer sidewall of the movable base 3 and the second inner surface 121 in the second recess 124 when the part of the movable base 3 is accommodated in the second recess 124.

In one example, as shown in FIG. 7, the second housing 12 further includes a plurality of protrusions 125 spaced apart from each other on the second inner surface 121 in the second recess 124; and a second gap 32 is defined between the plurality of protrusions 125 and the outer surface of the movable base 3, and the second gap 32 is smaller than the first gap 31.

In one example, as shown in FIG. 8 and FIG. 9, the first housing 11 includes a first sidewall 1141 and a second sidewall 1142 opposite each other, and the first sidewall 1141 and the second sidewall 1142 are in the first recess 114; and the movable base 3 is slidably connected to the first sidewall 1141 and the second sidewall 1142 to be slid out or slid into the first recess 114.

In one example, as shown in FIG. 10, a first guiding rail 1146 is recessed on the first sidewall 1141, a second guiding rail 1147 is recessed on the second sidewall 1142, and extending directions of the second guiding rail 1147 and the first guiding rail 1146 are same; a first guiding block 37 and a second guiding block 38 opposite to each other are disposed on the movable base 3; the first guiding block 37 is slidably mounted on the first guiding rail 1146, and the second guiding block 38 is slidably mounted on the second guiding rail 1147.

In one example, as shown in FIG. 11 and FIG. 12, the first inner surface 111 in the first recess 114 is arced, the outer sidewall of the movable base 3 is arced, and the outer sidewall of the movable base 3 is opposite to the first inner surface 111 in the first recess 114; and the movable base 3 is rotatably connected to the first housing 11 to be rotated out or into the first recess 114.

In one example, as shown in FIGS. 3, 6 and 13, a projection-shape of the second recess 124 on the first inner surface 111 and an opening-shape of the first recess 114 on the first inner surface 111 are substantially same.

In one example, as shown in FIG. 8, the first circumferential side surface 113 includes a first top surface 1131, a first bottom surface 1132 opposite to the first top surface 1131, and a first side surface 1133 connected between the first top surface 1131 and the first bottom surface 1132. The first recess 114 is extended to one of the first top surface 1131, the first bottom surface 1132, and the first side surface 1133.

In one example, the display screen 2 is a flexible display screen. The first outer surface 112, an outer surface of the bendable member 13, and the second outer surface 122 collectively carry the display screen 2.

In one example, as shown in FIG. 6, the support assembly 1 further includes a first locking member 151 disposed on the first housing 11 and a second locking member 152 disposed on the second housing 12. The first locking member 151 is cooperated with the second locking member 152 when the support assembly 1 is folded.

In one example, the first locking member 151 is a first permanent magnet, the second locking member 152 is a second permanent magnet, and the first permanent magnet is magnetically attracted to the second permanent magnet when the support assembly 1 is folded.

In one example, the first locking member 151 is a block protruded from the first inner surface 111, the second locking member 152 is a slot recessed in the second inner surface 121, and the block is engaged with the slot when the support assembly 1 is folded.

In one example, as shown in FIGS. 3 and 5, an orientation of an image capturing surface of the camera 41 is same as that of the first inner surface 111. As shown in FIG. 17, the mobile terminal 100 further includes a controller 5 accommodated in the first housing 11 or the second housing 12 and configured to receive a shooting signal, detect that the support assembly 1 is in an unfolded state or a folded state based on the shooting signal, and control the camera 41 to take a shooting when the support assembly 1 is in the unfolded state, and drive the movable base 3 to carry the camera 41 to move out the first recess 114 and control the camera 41 to take a shooting when the support assembly 1 is in the folded state.

In one example, the display screen 2 includes a first display area 2a overlapped with the first outer surface 112 and a second display area 2b overlapped with the second outer surface 122. The controller 5 is further configured to determine that the shooting signal is for front-shooting or rear-shooting, switch the first display area 2a to display a shooting interface of the camera 41 when the shooting signal is for rear-shooting, and switch the second display area 2b to display the shooting interface of the camera 41 when the shooting signal is for front-shooting.

In another example, as shown in FIGS. 3 and 15, an orientation of an image capturing surface of the camera 41 is same as that of the first outer surface 112. As shown in FIG. 18, the mobile terminal 100 further includes a controller 5 accommodated in the first housing 11 or the second housing 12 and configured to receive a shooting signal, drive the movable base 3 to carry the camera 41 to move out the first recess 114, and control the camera 41 to take a shooting based on the shooting signal.

In one example, the display screen 2 includes a first display area 2a overlapped with the first outer surface 112 and a second display area 2b overlapped with the second outer surface 122. The controller 5 is further configured to determine that the shooting signal is for front-shooting or rear-shooting, switch the first display area 2a to display a shooting interface of the camera 41 when the shooting signal is for front-shooting, and switch the second display area 2b to display the shooting interface of the camera 41 when the shooting signal is for rear-shooting.

In another embodiment, as shown in FIGS. 1-22, a mobile terminal 100 includes a first housing 11 defining a first recess 114, a second housing 12 defining a second recess 124, a bendable member 13, and a movable base 3 with a camera 41. The bendable member 13 is connected between the first housing 11 and the second housing 12 to enable the first housing 11 is unfolded or folded with respect to the second housing 12. The movable base 3 with a camera 41 is movably mounted on the first housing 11. The movable base 3 with the camera 41 is configured to be accommodated in the first recess 114 when the first housing 11 is unfolded with respect to the second housing 12, and configured to be accommodated a chamber defining by the first recess 114 and the second recess 124 when the first housing 11 is folded with respect to the second housing 12.

In one example, as shown in FIGS. 3 and 5, an image capturing surface of the camera 41 faces a wall of the first housing 11 in the first recess 114. The movable base 3 with the camera 41 is moved out the chamber such that the camera 41 is able to take a shooting when the first housing 11 is folded with respect to the second housing 12, and the movable base 3 with the camera 41 is moved out the first recess 114 such that the camera 41 is able to take a shooting when the first housing 11 is unfolded with respect to the second housing 12.

In another example, as shown in FIGS. 3 and 15, an image capturing surface of the camera 41 faces a wall of the second housing 12 in the second recess 124. The movable base 3 with the camera 41 is moved out the chamber such that the camera 41 is able to take a shooting when the first housing 11 is folded with respect to the second housing 12, and the movable base 3 with the camera 41 is moved out or retracted into the first recess 114 such that the camera 41 is able to take a shooting when the first housing 11 is unfolded with respect to the second housing 12.

In another embodiment, as shown in FIGS. 1-22, a mobile terminal 100 includes a first housing 11 defining a first recess 114, a second housing 12 defining a second recess 124, a bendable member 13, a display screen 2, and a movable base 3. The bendable member 13 is connected between the first housing 11 and the second housing 12 to enable the first housing 11 is unfolded or folded with respect to the second housing 12. The display screen 2 is disposed on the first housing 11, the second housing 12, and the bendable member 13. The movable base 3 with a camera 41 is movably mounted on the first housing 11. The movable base 3 with the camera 41 is configured to be accommodated in the first recess 114 when the first housing 11 is unfolded with respect to the second housing 12, and configured to be accommodated a chamber defining by the first recess 114 and the second recess 124 when the first housing 11 is folded with respect to the second housing 12.

It should be noted that the controller described in the embodiments of the present disclosure is presented in the form of a functional unit. The term "unit" as used herein shall be understood to be the broadest possible meaning, and the object for implementing the functions described for each "unit" may be, for example, an integrated circuit ASIC, a single circuit, processor (shared, dedicated or chipset) and memory executing one or more software or firmware, combinational logic, and/or other suitable components that perform the functions described above.

A computer storage medium is further provided in embodiments of the present disclosure. The computer storage medium stores computer programs for electronic data exchange. The computer programs cause a computer to perform some or all of the actions of any of the methods described in the foregoing embodiments. The above computer includes a mobile terminal.

A computer program product is provided in embodiments of the present disclosure. The computer program product includes a non-transitory computer readable storage medium storing a computer program. The computer programs cause a computer to perform some or all of the actions of any of the methods described in the foregoing embodiments. The computer program product can be a software installation package, and the above computer includes a mobile terminal.

It should be noted that, for the foregoing method embodiments, for the sake of brevity, they are all described as a series of action combinations, but those skilled in the art should understand that the present disclosure is not limited by the described action sequence. Because certain steps may be performed in other sequences or concurrently in accordance with the present disclosure. In the following, those skilled in the art should also understand that the embodiments described in the specification are all preferred embodiments, and the actions and modules involved are not necessarily required by the present disclosure.

In the above embodiments, the descriptions of the various embodiments are all focused on, and the parts that are not detailed in a certain embodiment can be referred to the related descriptions of other embodiments.

In several embodiments provided herein, it should be understood that the disclosed apparatus may be implemented in other ways. For example, the device embodiments described above are merely illustrative. For example, the division of the above units is only a logical function division. In actual implementation, there may be another division manner. For example, multiple units or components may be combined or integrated to another system, or some features can be ignored or not executed. In addition, the mutual coupling or direct coupling or communication connection shown or discussed may be an indirect coupling or communication connection through some interface, device or unit, and may be electrical or otherwise.

The units described above as separate components may or may not be physically separated, and the components illustrated as units may or may not be physical units, which may be located in one place, or may be distributed to multiple network units. Some or all of the units may be selected according to actual needs to achieve the purpose of the solution of the embodiment.

In addition, each functional unit in each embodiment of the present disclosure may be integrated into one processing unit, or each unit may exist physically separately. Alternatively, two or more units may also be integrated into one unit. The above integrated unit can be implemented in the form of hardware or in the form of a software functional unit.

The above-described integrated unit can be stored in a computer readable memory if it is implemented in the form of a software functional unit and sold or used as a standalone product. Based on such understanding, the technical solution of the present disclosure, in essence or the contribution to the prior art, or all or part of the technical solution may be embodied in the form of a software product. The software product is stored in a memory, which includes a number of instructions causing a computer device (which may be a personal computer, server or network device, etc.) to perform all or part of the actions of the above-described methods of various embodiments of the present disclosure. The foregoing memory includes a U disk, a Read-Only Memory (ROM), a Random Access Memory (RAM), a removable hard disk, a magnetic disk, or an optical disk, and the like, which can store program codes.

One of ordinary skill in the art can understand that all or part of the various methods of the above embodiments can be completed by related hardware instructed by a program. The program can be stored in a computer readable memory, and the memory can include a flash drive, read-only memory (ROM), random access memory (RAM), disk or CD.

The embodiments of the present disclosure have been described in detail above, and the principles and implementations of the present disclosure are described in the specific examples. The description of the above embodiments is only used to help understand the method of the present disclosure and its core ideas. For a person skilled in the art, there will have a change in the specific embodiments and the scope of present disclosure according to the idea of the present disclosure. In summary, the content of the present specification should not be construed as limiting the present disclosure.

What is claimed is:

1. A mobile terminal, comprising:
a support assembly comprising:
a first housing defining a first recess, comprising:
a first inner surface;
a first outer surface disposed opposite to the first inner surface; and
a first circumferential side surface connected between the first inner surface and the first outer surface; wherein the first inner surface is recessed toward the first outer surface such that the first recess is defined, and the first recess is extended to the first circumferential side surface;
a second housing defining a second recess, comprising:
a second inner surface opposite to the first inner surface when the support assembly is folded; and
a second outer surface disposed opposite to the second inner surface;
wherein the first recess is covered by a projection of the second recess on the first inner surface; and
a bendable member connected between the first housing and the second housing and having a capacity of being unbent or bent to unfold or fold the support assembly;
a display screen, wherein a part of the display screen is carried on the first outer surface, and another part of the display screen is carried on the second outer surface; and
a movable base movably mounted in the first recess, wherein a camera is disposed in the movable base, the movable base is able to carry the camera to move out or retract into the first recess with respect to the first circumferential side surface, and the second recess is configured to accommodate a part of the movable base.

2. The mobile terminal of claim 1, wherein a first gap is defined between an outer sidewall of the movable base and the second inner surface in the second recess when the part of the movable base is accommodated in the second recess.

3. The mobile terminal of claim 2, wherein the second housing further comprises a plurality of protrusions spaced apart from each other on the second inner surface in the second recess; and a second gap is defined between the plurality of protrusions and the outer surface of the movable base, and the second gap is smaller than the first gap.

4. The mobile terminal of claim 2, wherein the first housing comprises a first sidewall and a second sidewall opposite each other, and the first sidewall and the second sidewall are in the first recess; and the movable base is slidably connected to the first sidewall and the second sidewall to be slid out or slid into the first recess.

5. The mobile terminal of claim 4, wherein a first guiding rail is recessed on the first sidewall, a second guiding rail is recessed on the second sidewall, and extending directions of the second guiding rail and the first rail are same; a first guiding block and a second guiding block opposite to each other are disposed on the movable base; the first guiding block is slidably mounted on the first guiding rail, and the second guiding block is slidably mounted on the second guiding rail.

6. The mobile terminal of claim 2, wherein the first inner surface in the first recess is arced, the outer sidewall of the movable base is arced, and the outer sidewall of the movable base is opposite to the first inner surface in the first recess; and the movable base is rotatably connected to the first housing to be rotated out or into the first recess.

7. The mobile terminal of claim 4, wherein a projection-shape of the second recess on the first inner surface and an opening-shape of the first recess on the first inner surface are same.

8. The mobile terminal of claim 1, wherein the first circumferential side surface comprises a first top surface, a first bottom surface opposite to the first top surface, and a first side surface connected between the first top surface and the first bottom surface; and
the first recess is extended to one of the first top surface, the first bottom surface, and the first side surface.

9. The mobile terminal of claim 1, wherein the display screen is a flexible display screen; and the first outer surface, an outer surface of the bendable member, and the second outer surface collectively carry the display screen.

10. The mobile terminal of claim 1, wherein the support assembly further comprises:
a first locking member disposed on the first housing; and
a second locking member disposed on the second housing, wherein the first locking member is cooperated with the second locking member when the support assembly is folded.

11. The mobile terminal of claim 10, wherein the first locking member is a first permanent magnet, the second locking member is a second permanent magnet, and the first permanent magnet is magnetically attracted to the second permanent magnet when the support assembly is folded.

12. The mobile terminal of claim 10, wherein the first locking member is a block protruded from the first inner surface, the second locking member is a slot recessed in the second inner surface, and the block is engaged with the slot when the support assembly is folded.

13. The mobile terminal of claim 1, wherein an orientation of an image capturing surface of the camera is same as that of the first inner surface;
the mobile terminal further comprises a controller accommodated in the first housing or the second housing and configured to receive a shooting signal, detect that the support assemble is in an unfolded state or a folded state based on the shooting signal, and control the camera to take a shooting when the support assembly is in the unfolded state, and drive the movable base to carry the camera to move out the first recess and control the camera to take a shooting when the support assembly is in the folded state.

14. The mobile terminal of claim 13, wherein the display screen comprises a first display area overlapped with the first outer surface and a second display area overlapped with the second outer surface;
the controller is further configured to determine that the shooting signal is for front-shooting or rear-shooting, switch the first display area to display a shooting interface of the camera when the shooting signal is for rear-shooting, and switch the second display area to display the shooting interface of the camera when the shooting signal is for front-shooting.

15. The mobile terminal of claim 1, wherein an orientation of an image capturing surface of the camera is same as that of the first outer surface;
the mobile terminal further comprises a controller accommodated in the first housing or the second housing and configured to receive a shooting signal, drive the movable base to carry the camera to move out the first recess, and control the camera to take a shooting based on the shooting signal.

16. The mobile terminal of claim 15, wherein the display screen comprises a first display area overlapped with the first outer surface and a second display area overlapped with the second outer surface;

the controller is further configured to determine that the shooting signal is for front-shooting or rear-shooting, switch the first display area to display a shooting interface of the camera when the shooting signal is for front-shooting, and switch the second display area to display the shooting interface of the camera when the shooting signal is for rear-shooting.

17. A mobile terminal, comprising:

a first housing defining a first recess;

a second housing defining a second recess;

a bendable member connected between the first housing and the second housing to enable the first housing is unfolded or folded with respect to the second housing; and a movable base with a camera movably mounted on the first housing, wherein the movable base with the camera is configured to be accommodated in the first recess when the first housing is unfolded with respect to the second housing, and configured to be accommodated a chamber defining by the first recess and the second recess when the first housing is folded with respect to the second housing; wherein the movable base with the camera is able to be moved out or retracted into the first recess when the first housing is unfolded with respect to the second housing, and the movable base with the camera is able to be moved out or retracted into the chamber when the first housing is folded with respect to the second housing;

wherein an image capturing surface of the camera faces a wall of the first housing in the first recess;

the movable base with the camera is moved out the chamber such that the camera is able to take a shooting when the first housing is folded with respect to the second housing, and the movable base with the camera is moved out the first recess such that the camera is able to take a shooting when the first housing is unfolded with respect to the second housing; or wherein an image capturing surface of the camera faces a wall of the second housing in the second recess;

the movable base with the camera is moved out the chamber such that the camera is able to take a shooting when the first housing is folded with respect to the second housing, and the movable base with the camera is moved out or retracted into the first recess such that the camera is able to take a shooting when the first housing is unfolded with respect to the second housing.

18. A mobile terminal, comprising:

a first housing defining a first recess;

a second housing defining a second recess;

a bendable member connected between the first housing and the second housing to enable the first housing is unfolded or folded with respect to the second housing;

a display screen disposed on the first housing, the second housing, and the bendable member; and a movable base with a camera movably mounted on the first housing, wherein the movable base with the camera is configured to be accommodated in the first recess when the first housing is unfolded with respect to the second housing, and configured to be accommodated a chamber defining by the first recess and the second recess when the first housing is folded with respect to the second housing; wherein the movable base with the camera is able to be moved out or retracted into the first recess when the first housing is unfolded with respect to the second housing, and the movable base with the camera is able to be moved out or retracted into the chamber when the first housing is folded with respect to the second housing;

wherein an image capturing surface of the camera faces a wall of the first housing in the first recess;

the movable base with the camera is moved out the chamber such that the camera is able to take a shooting when the first housing is folded with respect to the second housing, and the movable base with the camera is moved out the first recess such that the camera is able to take a shooting when the first housing is unfolded with respect to the second housing; or wherein an image capturing surface of the camera faces a wall of the second housing in the second recess;

the movable base with the camera is moved out the chamber such that the camera is able to take a shooting when the first housing is folded with respect to the second housing, and the movable base with the camera is moved out or retracted into the first recess such that the camera is able to take a shooting when the first housing is unfolded with respect to the second housing.

\* \* \* \* \*